(12) United States Patent
Aldrey et al.

(10) Patent No.: US 8,693,838 B1
(45) Date of Patent: Apr. 8, 2014

(54) DIGITAL VIDEO RECORDING ("DVR") DATA EXCHANGE SYSTEMS AND METHODS

(71) Applicant: Verizon Patent and Licensing Inc., Arlington, VA (US)

(72) Inventors: Raul I. Aldrey, Plano, TX (US); Donald H. Relyea, Dallas, TX (US); Venkata S. Adimatyam, Irving, TX (US); Kishore Tallapaneni, Flower Mound, TX (US); Michael R. Oliver, Hoboken, NJ (US); George M. Higa, Plano, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 13/731,928

(22) Filed: Dec. 31, 2012

(51) Int. Cl.
*H04N 5/765* (2006.01)
*H04N 5/76* (2006.01)

(52) U.S. Cl.
USPC .......................................... 386/200; 386/235

(58) Field of Classification Search
USPC .......... 386/200, 235, 239, 248, 323, 324, 341
See application file for complete search history.

(56) References Cited

U.S. PATENT DOCUMENTS

| | | | |
|---|---|---|---|
| 2005/0276577 A1* | 12/2005 | Yoda et al. | 386/95 |
| 2007/0180500 A1* | 8/2007 | Tanada | 726/4 |

* cited by examiner

*Primary Examiner* — Robert Chevalier

(57) ABSTRACT

An exemplary method includes a digital video recording ("DVR") data exchange system 1) maintaining first porting configuration data associated with a first DVR service system and second porting configuration data associated with a second DVR service system, 2) receiving a request to port DVR data from a first DVR system associated with the first DVR service system to a second DVR system associated with the second DVR service system, and 3) in response to the request, accessing a first DVR data set associated with the first DVR system, generating, in accordance with the first porting configuration data and the second porting configuration data, a second DVR data set based on the first DVR data set, and providing the second DVR data set as output. Corresponding methods and systems are also disclosed.

22 Claims, 20 Drawing Sheets

DIGITAL VIDEO RECORDING ("DVR") DATA EXCHANGE SYSTEMS AND METHODS

BACKGROUND INFORMATION

Digital video recording ("DVR") systems allow users to record media content assets (e.g., television programs, etc.) and then view or otherwise experience the recorded media content assets. For example, a user may use a DVR system to schedule a recording of a particular television program, after which the DVR system may record the television program and allow the user to play back the recorded television program in a time-shifted manner.

Over time, a DVR system may record and store (e.g., within a hard drive) an extensive library of media content assets. The DVR system may also store DVR data associated with the library of media content assets and/or the DVR system. The DVR data may include metadata descriptive of the media content assets, data representative of settings (e.g., recording instructions provided by the user, recording conflict resolution rules, etc.) of the DVR system, and/or data representative of business logic used by the DVR system to implement the various recording instructions provided by the user and/or any other operation performed by the DVR system.

Unfortunately, if the user desires to upgrade or otherwise switch to a new DVR system, the user typically has to program the new DVR system from scratch. For example, the user may have to provide a whole new set of recording instructions to the new DVR system and interact extensively with the new DVR system for the new DVR system to "learn" (i.e., develop the appropriate business logic) the tendencies and/or preferences of the user. This process can be tedious, time consuming, and daunting for the user, especially if the new DVR system has a different interface and/or different specifications than the previous DVR system.

Moreover, it may be difficult or even impossible for the user to rebuild the library of media content assets that he or she had recorded on the previous DVR system. For example, the user may have to manually identify each media content asset that had been recorded and then manually determine how to acquire each media content asset (e.g., by searching within an electronic program guide for a rebroadcast of a particular media content asset and then directing the new DVR system to record the media content asset when it is rebroadcast). In addition to being tedious and time consuming for the user, this process may be futile for some media content assets if they are not scheduled to for rebroadcast.

Such problems and/or difficulties associated with switching to a new DVR system may be exacerbated in situations where the switch requires the user to change DVR service providers. For example, different DVR service providers may utilize different DVR data (e.g., different DVR data formats and/or content). For instance, DVR service providers may have different relationships with content and/or data providers and/or may utilize different media content metadata (e.g., metadata from different metadata providers) having different formats and/or content. Moreover, DVR systems associated with different DVR service providers may have different specifications (e.g., different capabilities, resources, etc.). For these and/or other reasons, a user who changes from one DVR service provider to another DVR service provider traditionally has had few if any options for migrating DVR data and/or recorded media content assets from a previous DVR system to a new DVR system.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

DVR data exchange methods and systems are described herein. As described in detail herein, in certain examples, the methods and systems described herein may provide a DVR data exchange service configured to facilitate a porting of DVR data across different DVR service systems associated with one or more DVR service providers (e.g., as a business-to-business exchange between DVR service providers). In certain examples, the porting may be performed in conjunction with (e.g., as part of) a migration of a user account from a first DVR system to a second DVR system, such as described herein.

Various benefits may be realized in accordance with the methods and systems described herein. For example, the methods and systems described herein may allow a user to migrate from using a first DVR system to using a second DVR system without having to manually program the second DVR system to operate like the first DVR system, without losing access to a library of media content assets stored by the first DVR system, and/or without having to manually rebuild the library of media content assets over time. Additionally or alternatively, the methods and systems described herein may allow a DVR service provider and/or DVR system user to utilize a DVR data exchange service to facilitate porting of DVR data from a first DVR system to a second DVR system. The DVR data exchange service may make such porting of DVR data convenient, accurate, and/or simple, even when the first and second DVR systems have different specifications, are part of different DVR service systems, and/or are associated with different DVR service providers.

These and/or other benefits or advantages of the exemplary systems and methods will be made apparent herein. Exemplary DVR data exchange methods and systems will now be described with reference to the drawings.

Figure 1:
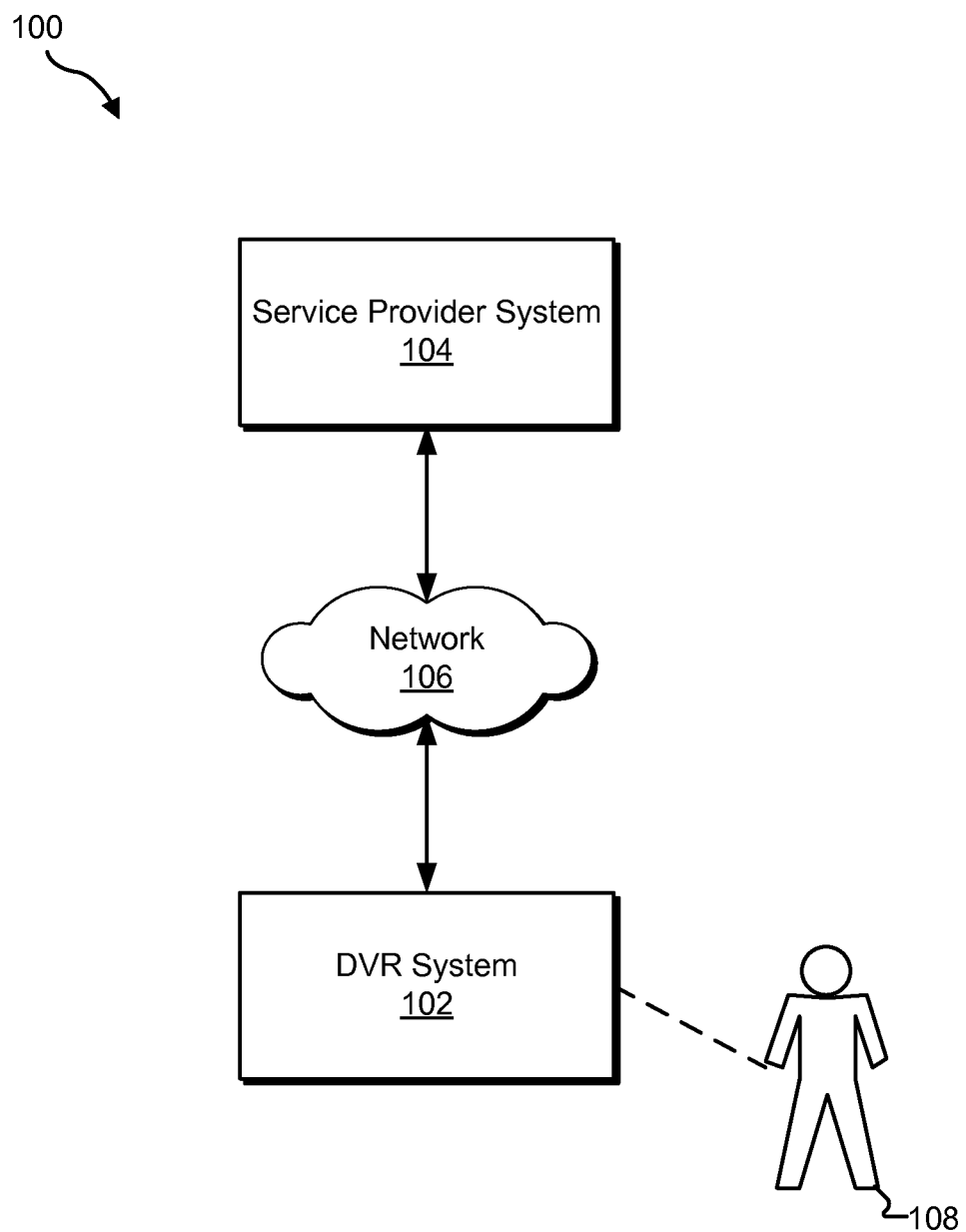
FIG. 1 illustrates an exemplary configuration in which a DVR system is communicatively coupled to a service provider system according to principles described herein.

FIG. 1 illustrates an exemplary system configuration 100 in which a DVR system 102 is communicatively coupled to a service provider system 104. DVR system 102 and service provider system 104 may communicate with one another using any suitable communication technologies, devices, media, and protocols supportive of data communications, including, but not limited to, socket connections, Ethernet, data bus technologies, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Evolution Data Optimized Protocol ("EVDO"), Time Division Multiple Access ("TDMA") technologies, Short Message Service ("SMS"), Multimedia Message Service ("MMS"), radio frequency ("RF") signaling technologies, wireless communication technologies (e.g., Bluetooth, Wi-Fi, etc.), in-band and out-of-band signaling technologies, and other suitable communications technologies.

DVR system 102 and service provider system 104 may communicate using any suitable network. For example, as shown in FIG. 1, DVR system 102 and service provider system 104 may be configured to communicate with each other by way of network 106. Network 106 may include one or more networks or types of networks capable of carrying communications and/or data signals between DVR system 102 and service provider system 104. For example, network 106 may include, but is not limited to, a cable network, an optical fiber network, a hybrid fiber coax network, a wireless network (e.g., a Wi-Fi and/or mobile telephone network), a satellite network, a wireless broadcast network (e.g., a satellite media broadcasting network or terrestrial broadcasting network), a subscriber television network, a provider-specific network, the Internet, an intranet, a local area network, any other suitable network, and/or any combination or sub-combination of these networks.

Service provider system 104 may be associated with one or more providers of one or more services, such as a provider of a DVR service (e.g., a subscription DVR service), a television service (e.g., a subscription television service), an electronic media program guide service (e.g., a media program guide data distribution service), an Internet service, a video-on-demand service, a media content distribution service, a media content source service, and/or any other type of media content service. Accordingly, service provider system 104 may be configured to provide one or more of these services for access by DVR system 102. For example, service provider system 104 may be configured to manage (e.g., maintain, process, distribute, and/or generate) media content assets and/or electronic program guide data configured to be delivered to DVR system 102. Service provider system 104 may be implemented by one or more computing devices (e.g., one or more servers associated with one or more entities) as may serve a particular implementation.

DVR system 102 may facilitate access by one or more users to one or more services and/or media content (e.g., media content assets) provided by service provider system 104. For example, DVR system 102 may present and/or record media content assets at the direction of one or more users. To this end, DVR system 102 may include one or more tuners. Each tuner may be configured to be tuned to a particular media content asset at the direction of DVR system 102 and/or at the direction of a user of DVR system 102. This may be performed in any suitable manner. For example, a tuner may tune to a media content asset by tuning to a media content channel carrying the media content asset. Additionally or alternatively, a tuner may tune (e.g., switch) to a digital stream of data packets (e.g., Internet Protocol ("IP") based data packets) carrying the media content asset. A "tuner" may be implemented by one or more hardware components and/or one or more software components.

In some examples, DVR system 102 may be associated with a user account maintained by and/or otherwise corresponding to one or more users (e.g., user 108 shown in FIG. 1). For example, the user may associate his or her user account with DVR system 102 by subscribing to a DVR service provided by service provider system 104 for access by way of DVR system 102, registering the user account with DVR system 102 (e.g., by logging in to DVR system 102), and/or in any other manner.

A user account associated with DVR system 102 may be associated with a library of media content assets stored by DVR system 102, such as a library of media content assets that have been recorded over time by DVR system 102.

The user account associated with DVR system 102 may also be associated with a DVR data set maintained by DVR system 102. As used herein, the terms "DVR data" and "DVR data set" may refer to any data associated with (e.g., maintained and/or used by) a DVR system. In some examples, the DVR data may be separate from data representative of the actual media content included in a library of media content assets stored by the DVR system (i.e., the DVR data may be separate from one or more data files representative of each media content asset included in the library of media content assets). For example, a DVR data set associated with DVR system 102 that a user has used over a period of time to acquire (e.g., record) a library of media content assets may include metadata descriptive of one or more characteristics of the media content assets (e.g., electronic program guide data obtained from an electronic program guide data provider), data representative of settings of the DVR system (e.g., recording instructions provided by the user to acquire the media content assets, recording conflict resolution rules, etc.), and/or data representative of business logic used by the DVR system to implement the various recording instructions provided by the user and/or any other operation performed by the DVR system.

In some examples, DVR system 102 may be provided and/or otherwise managed by a service provider associated with service provider system 104. For example, DVR system 102 may be provided (e.g., leased to a user) by a particular DVR service provider and/or subscriber television service provider.

DVR system 102 may be implemented by any suitable combination of media content processing or computing devices ("processing devices"). For example, DVR system 102 may be implemented by one or more local processing devices each associated with the same user account (i.e., processing devices that the user interacts with directly such as set-top box devices, DVR devices, receivers, personal computers, mobile devices (e.g., mobile phones and/or tablet computers), personal-digital assistant devices, gaming devices, television devices, etc.). Each processing device may include a storage device configured to store data associated with the processing device and one or more processors configured to perform the operations described herein.

Figure 2:
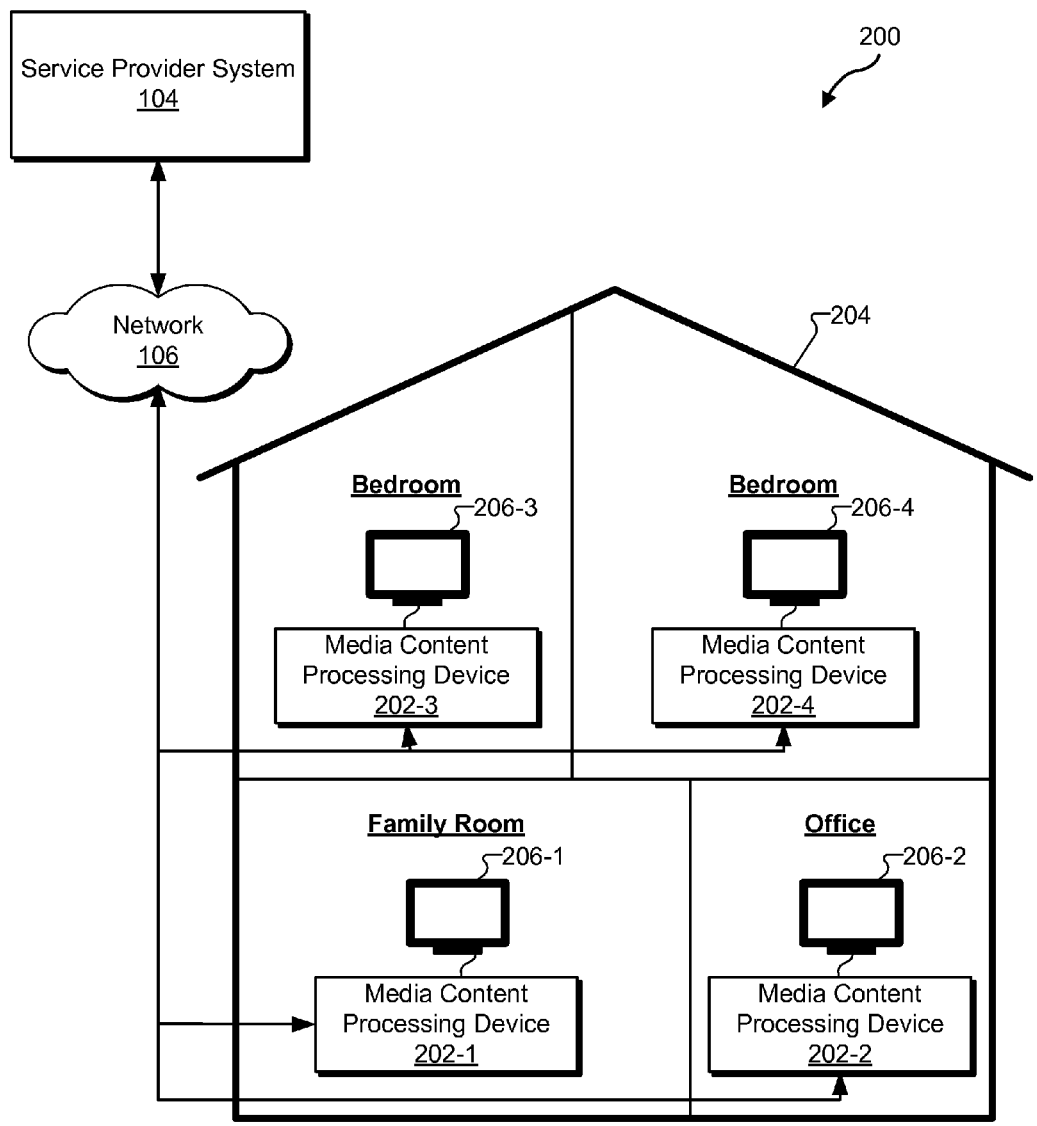
FIG. 2 shows an exemplary implementation of a DVR system according to principles described herein.

To illustrate, FIG. 2 shows an exemplary implementation 200 of DVR system 102 in which DVR system 102 is implemented by a plurality of media content processing devices 202 (e.g., media content processing devices 202-1 through 202-4) located within a particular premises 204 (e.g., a home). Each media content processing device 202 may be implemented by one or more of the local processing devices described herein. For example, each media content processing device may be implemented by a set-top box device having DVR capabilities.

As shown, media content processing devices 202 may be distributed throughout premises 204. For example, FIG. 2 shows that media content processing devices 202 are distributed throughout various rooms of premises 204. In this manner, users located within premises 204 may experience and/or otherwise interact with media content at various locations throughout premises 204.

Media content processing devices 202 may each be associated with (e.g., connected to) a display 206 (e.g., displays 206-1 through 206-4). Displays 206 may include any suitable display device separate from media content processing devices 202 (e.g., televisions, computer monitors, etc.) and/or any suitable display device integrated into media content processing devices 202 (e.g., display screens). Media content processing devices 202 may be configured to present media content by way of displays 206.

As shown, each media content processing device 202 may be communicatively coupled to service provider system 104 by way of network 106. This may be realized in any suitable manner, such as directly or by way of one or more intermediary devices such as a gateway device at premises 204.

Figure 3:
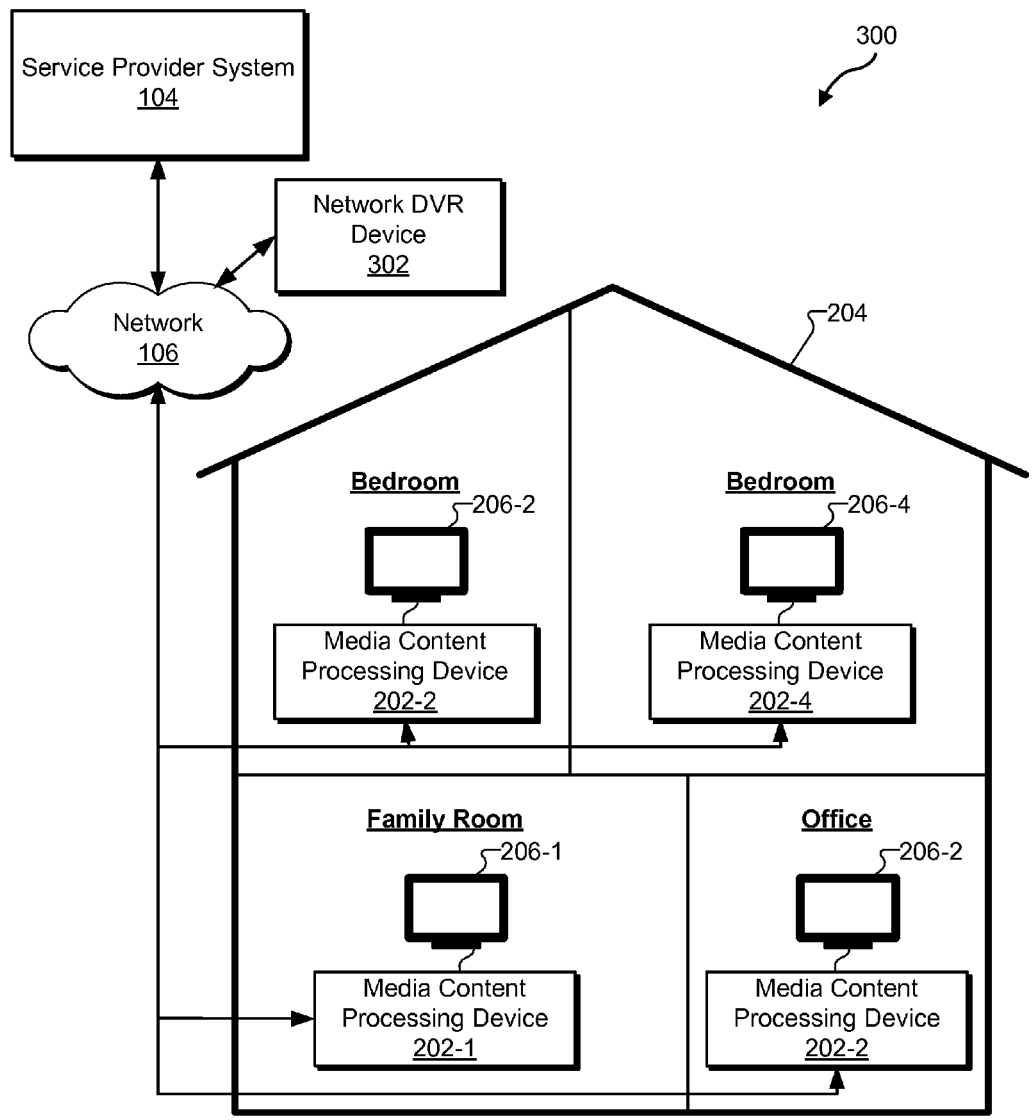
FIG. 3 shows another exemplary implementation of a DVR system according to principles described herein.

DVR system 104 may additionally or alternatively be implemented by one or more remote processing devices. For example, FIG. 3 shows another exemplary implementation 300 of DVR system 102 in which DVR system 102 is at least partially implemented by a network DVR device 302. Network DVR device 302 may be implemented by one or more computing devices (e.g., one or more servers) configured to provide DVR services.

As shown, network DVR device 302 may be remote from premises 204 and may be configured to communicate with media content processing devices 202 and service provider system 104 by way of network 106. In this implementation, network DVR device 302 may perform one or more DVR operations traditionally performed by local DVR devices. For example, network DVR device 302 may record and/or store media content assets, stream media content assets to media content processing devices 202, and/or perform any other DVR operation as may serve a particular implementation. Each media content processing device 202 may be configured to interface with network DVR device 302 such that one or more users located within premises 204 may direct network DVR device 302 to perform one or more DVR operations.

In some examples, network DVR device 302 may be associated with and/or maintained by a service provider associated with service provider system 104. For example, network DVR device 302 may be located at a premises maintained by a DVR service provider and/or a subscriber television service provider.

Figure 4:
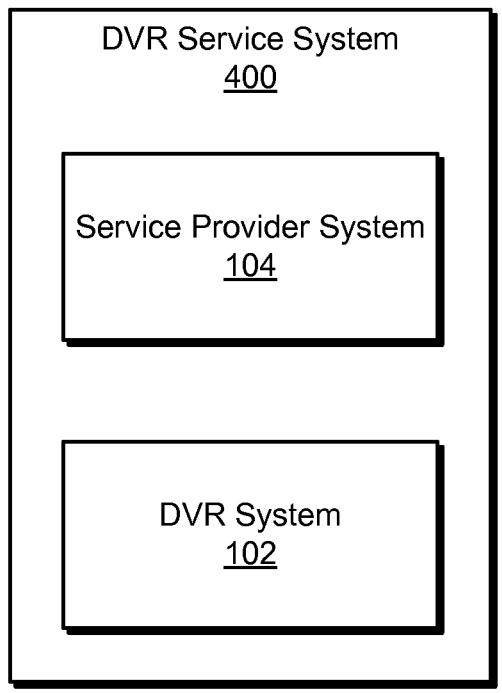
FIG. 4 illustrates an exemplary DVR service system that includes the DVR system and service provider system of FIG. 1 according to principles described herein.

A combination of DVR system 102 and service provider system 104 may be referred to as a "DVR service system." FIG. 4 illustrates an example of a DVR service system 400 that includes DVR system 102 and service provider system 104.

Figure 5:
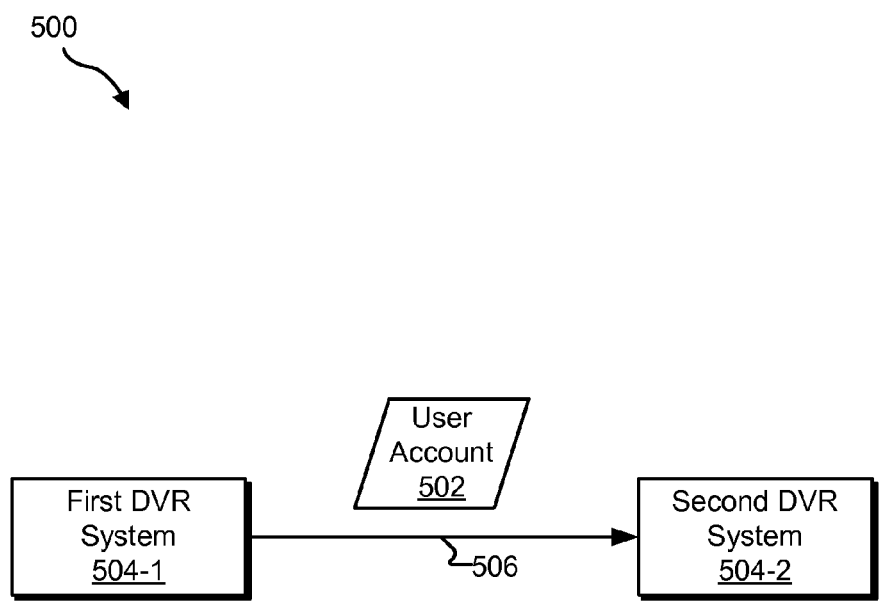
FIG. 5 illustrates an exemplary scenario in which a user account is migrated from being associated with a first DVR system to being associated with a second DVR system according to principles described herein.

FIG. 5 illustrates an exemplary scenario 500 in which a user account 502 is migrated from being associated with a first DVR system 504-1 to being associated with a second DVR system 504-2. The migration is represented in FIG. 5 by arrow 506. First and second DVR systems 504-1 and 504-2 (collectively "DVR systems 504") may be similar to DVR system 102 and may be implemented in any of the ways described herein.

Various situations may arise in which it is desirable for user account 502 to be migrated from being associated with first DVR system 504-1 to being associated with second DVR system 504-2, as shown in FIG. 5. For example, a user associated with user account 502 may desire to switch from a first DVR service provided by a first DVR service provider (e.g., a first subscriber television service provider) associated with (e.g., that provides) first DVR system 504-1 to a second DVR service provided by a second DVR service provider (e.g., a second subscriber television service provider) associated with (e.g., that provides) second DVR system 504-2.

Figure 6:
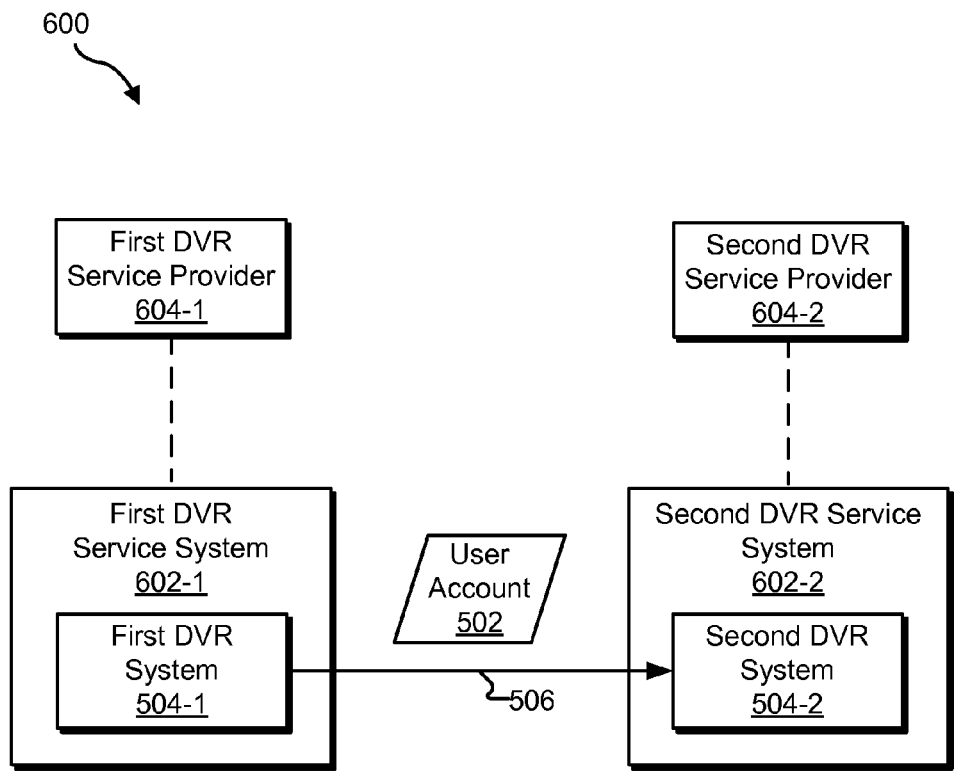
FIG. 6 illustrates an exemplary scenario in which a user account is migrated from being associated with a first DVR system of a first DVR service system to being associated with a second DVR system of a second DVR service system according to principles described herein.

FIG. 6 illustrates an exemplary scenario 600 in which user account 502 is migrated from being associated with the first DVR system 504-1 to being associated with the second DVR system 504-2 and in which the first DVR system 504-1 is part of a first DVR service system 602-1 associated with a first DVR service provider 604-1 and the second DVR system 504-1 is part of a second DVR service system 602-2 associated with a second DVR service provider 604-2.

A migration of user account 502 from the first DVR system 504-1 to the second DVR system 504-2 may include a DVR data porting component and a media content asset recovery component. In the DVR data porting component, a DVR data set associated with the first DVR system 504-1 may be ported to the second DVR service system 602-2 and associated with the second DVR system 504-2, such as described herein. After the DVR data set is associated with the second DVR system 504-2, the recovery component may be performed and may include the second DVR data system 504-2 being directed to use the DVR data set to recover, from one or more media content sources different from the first DVR system 504-1, one or more of the media content assets that were included in the library of media content assets stored by the first DVR system 504-1.

The exemplary DVR data exchange systems and methods described herein may facilitate a porting of DVR data from being associated with a first DVR system (e.g., first DVR system 504-1) to being associated with a second DVR system (e.g., second DVR system 504-2). The porting may be performed in conjunction with (e.g., as part of) a migration of a user account from being associated with the first DVR system to being associated with the second DVR system, such as described herein.

Figure 7:
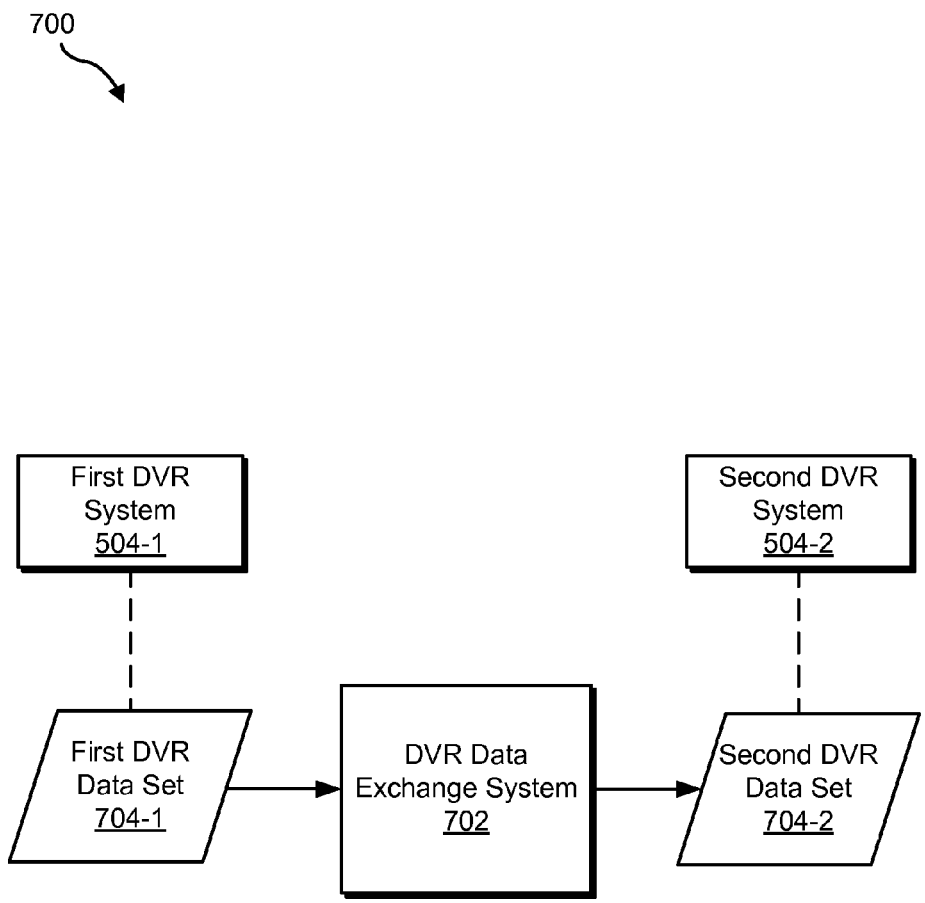
FIG. 7 illustrates a scenario in which a DVR data exchange system facilitates a porting of a DVR data set from a first DVR system to a second DVR system according to principles described herein.

FIG. 7 illustrates a scenario 700 in which a DVR data exchange system 702 ("system 702") facilitates a porting of a DVR data set from a first DVR system to a second DVR system. As shown, system 702 may receive or otherwise access a first DVR data set 704-1 associated with the first DVR system 504-1. System 702 may generate a second DVR data set 704-2 based on the first DVR data set 704-1 and provide, as output, the second DVR data set 704-2, which is configured to be associated with and used by the second DVR system 504-2. In this or a similar manner, system 702 may provide a DVR data exchange service that exchanges DVR data to facilitate porting of DVR data across DVR service systems (e.g., across DVR service systems 602-1 and 602-2).

Figure 8:
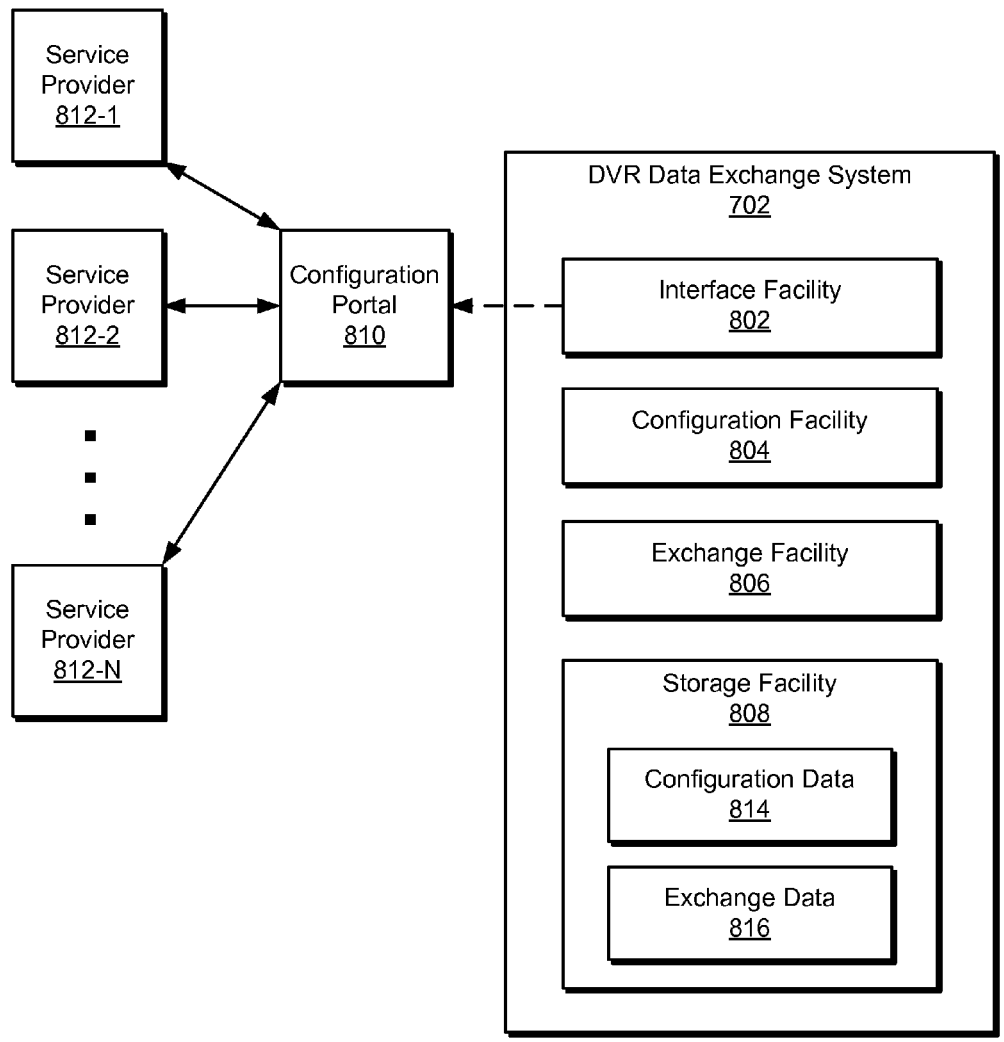
FIG. 8 illustrates components of an exemplary DVR data exchange system according to principles described herein.

Exemplary components and operations of system 702 will now be described. As shown in FIG. 8, system 702 may include, without limitation, an interface facility 802, a configuration facility 804, an exchange facility 806, and a storage facility 808 selectively and communicatively coupled to one another. It will be recognized that although facilities 802-808 are shown to be separate facilities in FIG. 8, any of facilities 802-808 may be combined into fewer facilities, such as into a single facility, or divided into more facilities as may serve a particular implementation. System 702 may be implemented by any suitable combination of computing devices and/or systems. For example, facilities 802-808 of system 702 may be implemented by one or more server devices.

Interface facility 802 may be configured to provide one or more interfaces by way of which one or more computing devices and/or entities (e.g., service providers and/or DVR system users) may interact with system 702. Interface facility 802 may provide any interface suitable for such interaction with system 702.

As shown in FIG. 8, for example, interface facility 802 may provide a configuration portal 810 ("portal 810") for access by one or more service providers 812 (e.g., service providers 812-1 through 812-N), which may be DVR service providers (e.g., operators of DVR service systems), media content providers, and/or any other providers of media content services. In certain examples, for instance, service provider 812-1 may be an operator of first DVR service system 602-1 and service provider 812-2 may be an operator of second DVR service system 602-2.

Service providers 812 may register with system 702 as service providers in any suitable manner. After such registration, portal 810 may be configured to authenticate the service providers 812 as registered service providers before granting the service providers 812 access to system 702 through portal 810.

Portal 810 may be configured to provide a user interface, such as a web site user interface, client application user interface, etc., through which authenticated service providers 812 may interact with system 702 to configure operations of system 702. For example, through a user interface provided by portal 810, a service provider 812 may provide (e.g., input and/or upload) porting configuration data for use by system 702 to configure operations of system 702. Porting configuration data provided by the service provider 812 may include any data potentially useful to system 702 to configure operations of system 702, such as by configuration operations of system 702 based on one or more attributes of a DVR service system associated with (e.g., operated by) the service provider 812 and/or porting preferences of the service provider 812.

Porting configuration data may include DVR system specifications associated with one or more DVR systems (e.g., a first set of DVR system specifications associated with a first DVR system and a second set of DVR system specifications associated with a second DVR system). The DVR system specifications may include data representative of one or more attributes of one or more DVR systems. For example, DVR system specifications may include, without limitation, one or more identifiers of a DVR system (e.g., a make, model, etc. of a DVR system), capabilities of a DVR system (e.g., media content encryption and/or decryption capabilities, media content coding and decoding capabilities, and features of a DVR system such as a feature that allows a user to customize the DVR system to automatically adjust recording start and stop times, such as to start recordings a few minutes earlier than a schedule-based start time and/or to stop recordings a few minutes later than a schedule-based stop time), resources of a DVR system (e.g., memory storage space such as a size of a hard drive and/or processing speed or resources of a system processor), identification and/or addressing information for a DVR system, media content formats (e.g., media content data formats) used and/or supported by a DVR system, attributes of other data used by a DVR system (e.g., a source or format of electronic program guide metadata used by a DVR system), and attributes of media content encryption and/or decryption technologies used by a DVR system.

Additionally or alternatively, porting configuration data may include DVR service specifications associated with one or more DVR services (e.g., a first set of DVR service specifications associated with a first DVR service and a second set of DVR service specifications associated with a second DVR service). The DVR service specifications may include data representative of one or more attributes of one or more DVR services. For example, DVR service specifications may include, without limitation, data representative of relationships and/or agreements between a DVR service provider and one or more media content providers, media content formats (e.g., media content data formats) used and/or supported by a DVR service system, attributes of other data used by a DVR service system (e.g., a source or format of electronic program guide metadata used by a DVR service system), and identification and/or addressing information for components of a DVR service system.

Additionally or alternatively, porting configuration data may include DVR data porting and/or user account migration settings defined by one or more DVR service providers and/or media content providers (e.g., a first set of porting settings defined by a first DVR service provider and a second set of porting settings defined by a second DVR service provider). For example, porting configuration data may include data representative of one or more settings specifying one or more rules and/or preferences for porting and/or migration operations involving a particular DVR service system and/or media content provided by a particular media content provider, such as rules specifying specific media content metadata that is allowed or banned from being ported to/from a particular DVR service system. For example, a media content provider (e.g., CBS, HBO, etc.) may upload porting configuration data specifying that certain media content is to be allowed to be migrated from one DVR service system to another DVR service system and/or specifying that other media content is not to be migrated from one DVR service system to another DVR service system.

A registered service provider 812 may provide porting configuration data to portal 810 to customize DVR data exchange operations of system 702. As an example, a media content provider may provide porting configuration data that specifies one or more rules for porting information about media content provided by the media content provider. For instance, the media content provider may provide porting configuration data that specifies that metadata for certain media content is not to be ported to a particular DVR service provider because of a lack of an agreement or relationship between the media content provider and the DVR service provider.

As another example, a DVR service provider may provide configuration data that specifies one or more rules for porting information from the DVR service provider's DVR service system to another DVR service system. For instance, the DVR service provider may provide porting configuration data that specifies that all DVR data is allowed to be ported to any other DVR service provider.

As another example, a DVR service provider may provide porting configuration data that specifies DVR system and/or service specifications for a DVR service system operated by the DVR service provider. Such data may be used by system 702 to tailor exchange operations involving the DVR service system to the specifications of the DVR service system. To illustrate, a DVR service provider may provide porting configuration data that specifies a particular format and/or source of media content metadata used by a DVR service system. System 702 may use this data to configuration operations of system 702, such as by configuring system 702 to expect a particular format for metadata accessed from the DVR service system and/or to output metadata in a particular format for use by the DVR service system. Such customization based on a metadata format and/or source may be useful inasmuch as different DVR service systems may utilize media content metadata from different sources and/or in different formats.

Figure 9:
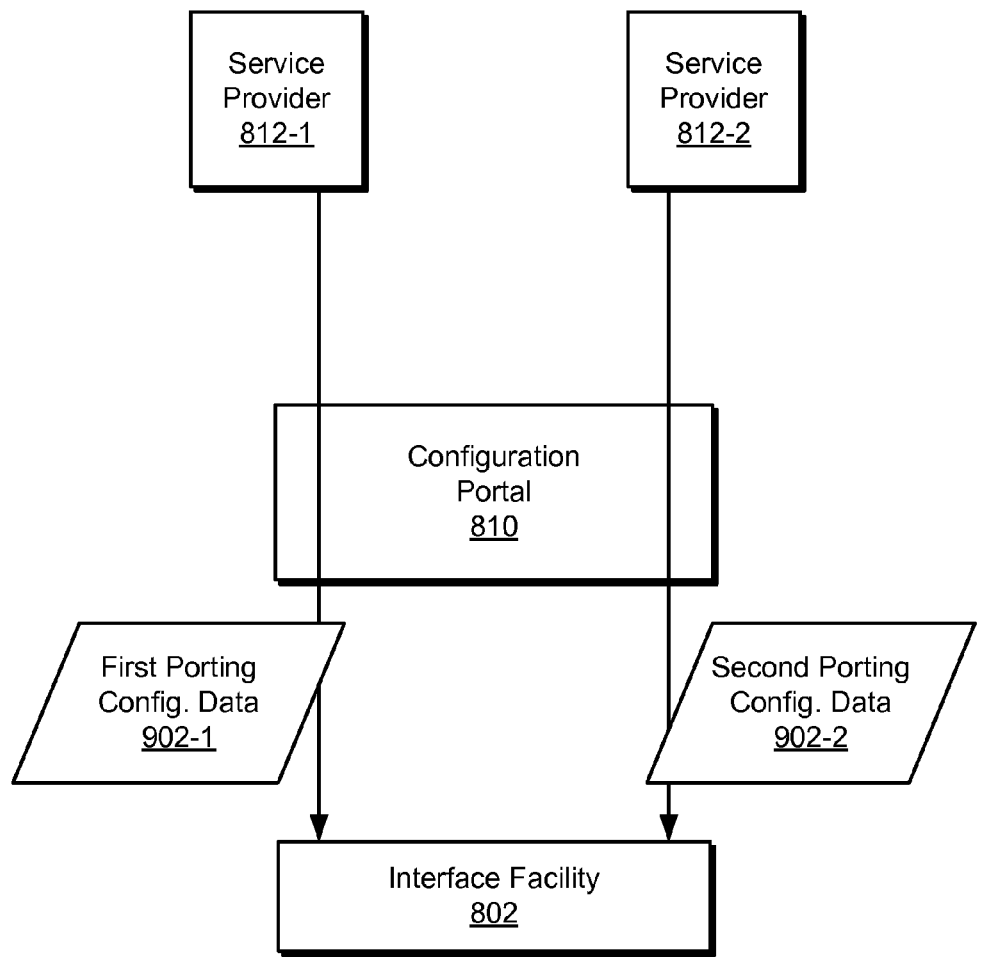
FIG. 9 illustrates an example of porting configuration data being received by way of a configuration portal according to principles described herein.

In any of the ways described above, service providers 812 may opt in to a DVR data exchange service provided by system 702 and provide porting configuration data to portal 702 for use by system 702 to customize operations of system 702. FIG. 9 illustrates an example of interface facility 802 receiving first porting configuration data 902-1 from a first service provider 812-1 and second porting configuration data 902-2 from a second service provider 812-2 by way of portal 810.

Returning to FIG. 8, configuration facility 804 may be configured to utilize porting configuration data received through portal 810 to configure system 702. To this end, configuration facility 804 may be configured to maintain porting configuration data as configuration data 814 stored in storage facility 808. The stored configuration data 814 may be maintained by configuration facility 804 and accessed and used by exchange facility 806 to perform one or more of the DVR data exchange operations described herein in accordance with the configuration data 814.

Configuration data 814 may also include configuration data defined by a provider (e.g., an operator) of system 702. For example, configuration data 814 may include data representative of predefined mappings between various data formats, the mappings having been defined by the provider of system 702. For example, configuration data 814 may be defined to include mappings between different media content metadata formats. The mappings may be configured to be used by exchange facility 806 to convert metadata from one metadata format to another metadata format, such as described herein.

With configuration data 814 maintained by configuration facility 804, system 702 is configured to perform DVR data exchange operations in accordance with the configuration data 814 to exchange DVR data to facilitate porting of DVR data across DVR service systems. Thus, the configuration data 812 may direct what and/or how DVR data is ported across DVR service systems.

Interface facility 802 may be configured to receive a request to port DVR data from a first DVR system associated with a first DVR service system to a second DVR system associated with a second DVR service system. For example, interface facility 802 may receive a request to port the DVR data from first DVR system 504-1 associated with first DVR service system 602-1 to second DVR system 504-2 associated with second DVR service system 602-2.

The request may be received from any suitable source. For example, the request may be provided by a DVR system user, a DVR service provider, an operator of system 702, and/or from any computing device associated therewith.

Figure 10:
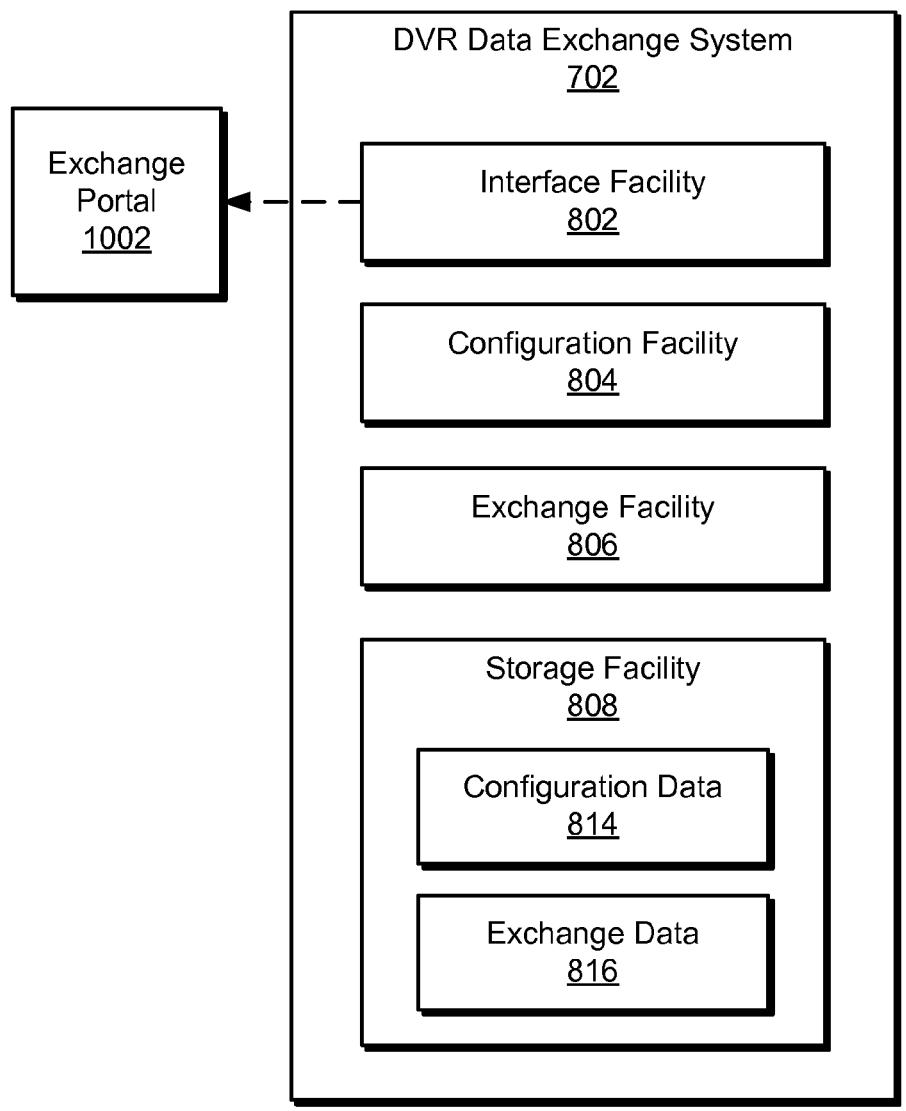
FIG. 10 illustrates an exemplary DVR data exchange system providing an exchange portal according to principles described herein.

In certain examples, the request may be received by interface facility 802 by way of a portal provided by interface facility 802. As shown in FIG. 10, for example, interface facility 802 may provide an exchange portal 1002. Portal 1002 may be configured to provide one or more interfaces by way of which one or more computing devices and/or entities may interact with system 702. For example, portal 1002 may be configured to provide a user interface, such as a website user interface, client application user interface, etc., through which entities (e.g., a DVR system user, a DVR service provider, and an operator of system 702) may interact with system 702 to request a porting of DVR data, to provide DVR data to system 702, and/or to receive DVR data output by system 702. Portal 1002 may additionally or alternatively be configured to provide a computing device interface (e.g., one or more application program interfaces ("APIs") through which computing devices may interact with system 702 to request a porting of DVR data, to provide DVR data to system 702, and/or to receive DVR data output by system 702.

In certain examples, a DVR system user may request a porting of DVR data from one DVR system to another. For example, the DVR system user may access portal 1002 and provide the request from a source DVR system, a destination DVR system (e.g., by establishing an account with and/or logging in to a new DVR system), or a different computing device.

In certain examples, a DVR service provider may request a porting of DVR data from one DVR system to another. For example, the DVR service provider user may access portal 1002 and provide the request from a service provider system (e.g., service provider system 104) associated with a source or destination DVR service system or from a different computing device.

In certain examples, an operator of system 702 may request a porting of DVR data from one DVR system to another. For example, the operator may access portal 1002 and provide the request from any suitable computing device.

Accordingly, any entity or computing device having access to portal 1002 may request a porting of DVR data by system 702.

A porting request may include any data useful to system 702 to perform one or more DVR data exchange operations to facilitate the requested porting. For example, a porting request may include identifiers for a source DVR system, a source DVR service system, a destination DVR system, a destination DVR service system, a DVR data set to be ported, and/or any other data related to the requested porting.

Figure 11:
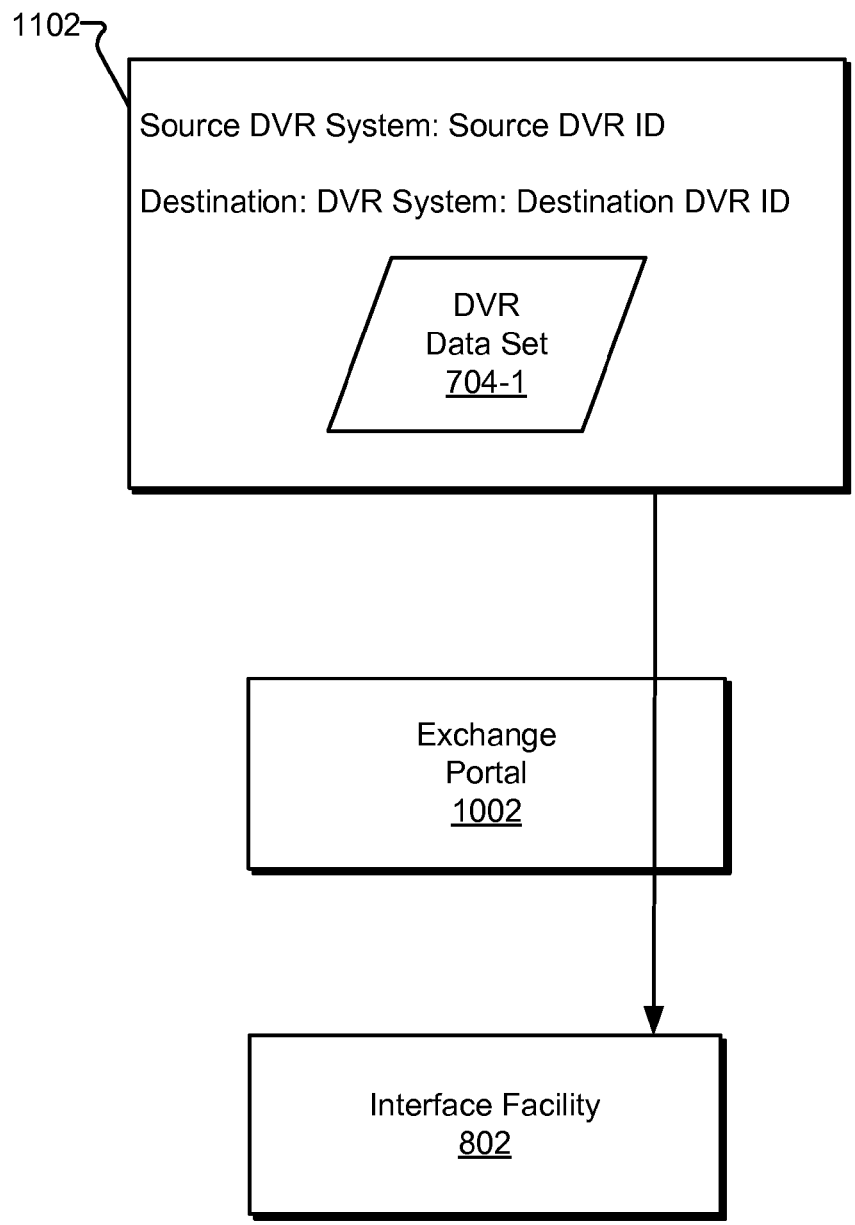
FIG. 11 illustrates an example of a porting request being received by way of an exchange portal according to principles described herein.

FIG. 11 illustrates an exemplary porting request 1102 received by interface facility 802 by way of exchange portal 1002. As shown, the request 1102 may include data specifying an identifier ("ID") for a source DVR system (e.g., DVR system 504-1), data specifying an ID for a destination DVR system (e.g., DVR system 504-2), and a DVR data set 704-1 that is to be ported. The contents of the request 1102 represented in FIG. 11 are illustrative only. Other porting requests may include additional or alternative data. For example, data representative of a DVR data set to be ported may be omitted from other porting requests.

Exchange facility 806 may receive a porting request, or at least a notification of a porting request, from interface facility 802. In response to the porting request or notification, exchange facility 806 may perform one or more DVR data exchange operations to facilitate the requested porting. Examples of such operations will now be described.

Exchange facility 806 may access a DVR data set that is subject of the requested porting. The subject DVR data set (or "first DVR data set") may be associated with (e.g., stored by) a source DVR system.

Exchange facility 806 may access the DVR data set in any suitable way. As an example, the porting request may include data representative of the DVR data set, and exchange facility 806 may access the DVR data set from the porting request. As another example, exchange facility 806 may initiate and system 702 may send a request for the DVR data set to a source DVR service system (e.g., to a source DVR system and/or to a service provider system of the source DVR service system). The source DVR service system may reply to the request by providing data representative of the DVR data set to system 702. As another example, exchange facility 806 may initiate and system 702 may send a request for the DVR data set to another computing device that is separate from the source DVR service system and that maintains a copy of the DVR data set (e.g., a computing device that stores a backup copy of the DVR data set). Exchange facility 806 may be configured to use source identifiers and/or addressing information included in the porting request and/or in the configuration data 814 (e.g., porting configuration data provided by a service provider) to request the DVR data set from an appropriate source.

Figure 12:
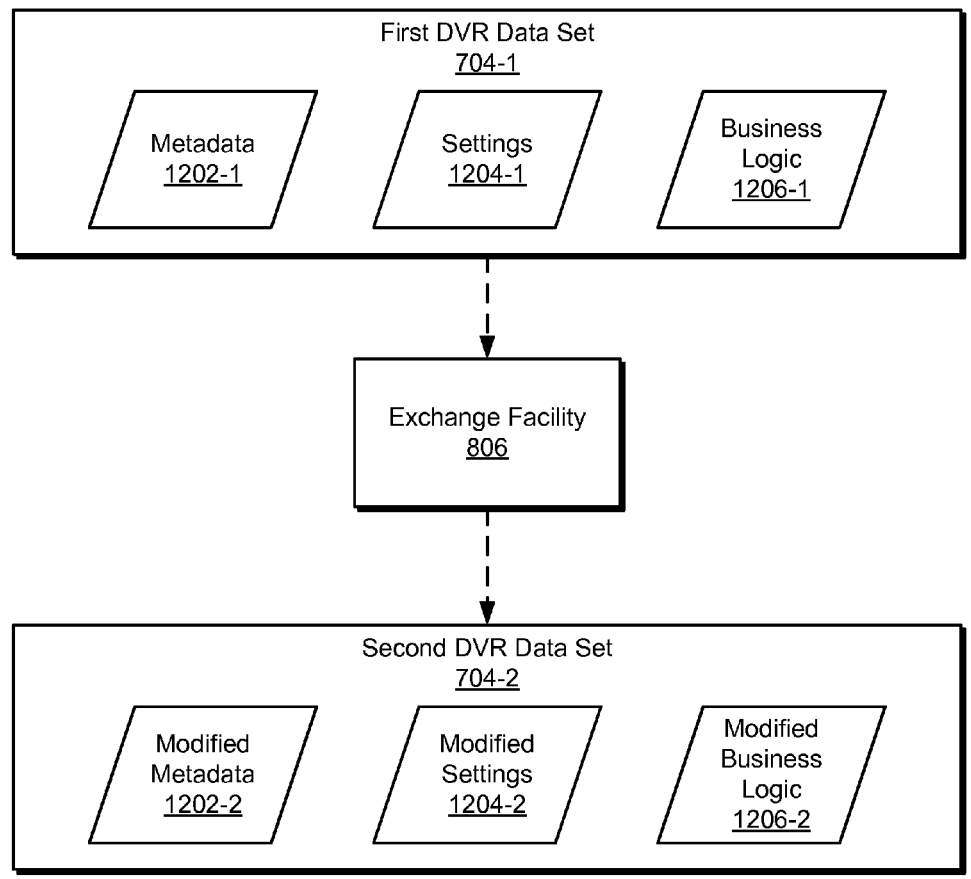
FIG. 12 illustrates an exemplary generation of a second DVR data set based on a first DVR data set according to principles described herein.

Exchange facility 806 may generate a second DVR data set based on the accessed first DVR data set and in accordance with configuration data 814 (e.g., in accordance with porting configuration data). FIG. 12 illustrates exchange facility 806 taking first DVR data set 704-1 as input, generating second DVR data set 704-2 based on first DVR data set 704-1, and providing second DVR data set 704-2 as output.

As shown, first DVR data set 704-1 may include metadata 1202-1, settings data 1204-1, and business logic data 1206-1 associated with one or more operations performed by a first DVR system. It will be recognized that first DVR data set 704-1 may include one or more of these types of data and/or any other type of data as may serve a particular implementation. Metadata 1202-1, settings data 1204-1, and business logic data 1206-1 will now be described in more detail.

Metadata 1202-1 may include any data descriptive of one or more attributes of the media content assets included in the library of media content assets stored by the first DVR system. For example, metadata 1202-1 may include, but is not limited to, time data, physical location data, user data, source data, destination data, size data, creation data, modification data, access data (e.g., play counts), and/or any other data descriptive of the media content assets. For example, metadata associated with a television program may include a title of the television program, a name of one or more people associated with the television program (e.g., actors, directors, producers, creators, etc.), a rating of the television program (e.g., user ratings, critic ratings, etc.), a synopsis of the television program, a setting of the television program, a theme of the television program, a format of the television program, a quality (e.g., resolution) of the television program, a size of the television program, a time or date associated with the television program (e.g., time or date of production, time or date of release, etc.), a color content of the television program, a bit rate of the television program, a compression amount of the television program, a codec associated with the television program, and/or any other information corresponding to the television program as may serve a particular application. Metadata corresponding to other types of media content assets may include additional or alternative information.

Metadata 1202-1 may be provided by a particular source (e.g., a media content metadata provider such as an electronic program guide data provider) and/or may have a particular format (e.g., data format). Information included in the metadata 1202-1 may be represented in accordance with the format. For example, the metadata 1202-1 may include a media content asset identifier in a particular format, a media content asset title in a particular format, a media content asset synopsis in a particular format, etc.

Settings data 1204-1 may be representative of one or more settings of the first DVR system. Settings data 1204-1 may be generated in response to user input. For example, settings data 1204-1 may be representative of one or more recording instructions provided by the user and/or one or more recording conflict resolution rules specified by the user. To illustrate, settings data 1204-1 may specify that the first DVR system is to record each episode of a television series scheduled to be broadcast over a period of time. Settings data 1204-1 may additionally or alternatively be generated automatically by the first DVR system. For example, settings data 1204-1 may be representative of one or more manners in which one or more options are presented to a user within an interface.

Business logic data 1206-1 may be representative of business logic used by the first DVR system to implement the various operations performed by the first DVR system. For example, business logic data 1206-1 may be representative of a manner in which the first DVR system handles the various recording requests provided by the user. To illustrate, business logic data 1206-1 may specify a manner in which a recording conflict is handled by the first DVR system when the user provides a request to record a particular media content asset.

Business logic data 1206-1 may be dynamically generated over time as the user interacts with the first DVR system. In this manner, the first DVR system may "learn" one or more tendencies and/or preferences of the user. For example, the first DVR system may recognize that the user likes to watch a particular genre of media content assets based on a viewing history of the user. The first DVR system may accordingly update its business logic data 1206-1 and, based on this data, automatically recommend one or more media content assets in the same genre to the user.

In some examples, exchange facility 806 may generate second DVR data set 704-2 by modifying the data included in first DVR data set 704-1 in accordance with configuration data 814 (e.g., porting configuration data). For example, as illustrated in FIG. 12, second DVR data set 704-2 may include modified metadata 1202-2, modified settings data 1204-2, and modified business logic data 1206-2. Modified metadata 2012-2 may include a modified version of metadata

1202-1, modified settings data 1204-2 may include a modified version of settings data 1204-1, and modified business logic data 1206-2 may include a modified version of business logic data 1206-1.

To illustrate, metadata 1202-1 may have a first metadata format used by the first DVR system, as mentioned above. However, the second DVR system may use a second metadata format, such as a format of metadata received from a different source of metadata. Differences between the metadata formats may cause the first metadata format to be unusable in whole or in part by the second DVR system. For example, the first metadata format may use a first format of media content asset identifiers, while the second metadata format may use a second format of media content asset identifiers. The second DVR system may be able to use the second format of media content asset identifiers to successfully identify media content assets, but may be unable to use the first format of media content asset identifiers to identify media content assets.

As part of generating the second DVR data set 704-2 based on the first DVR data set 704-1, exchange facility 806 may be configured to convert the metadata 1202-1 included in the first DVR data set 704-1 from the first metadata format to the second data format in accordance with configuration data 814. To this end, exchange facility 806 may be configured to determine that the metadata 1202-1 included in the first DVR data set 704-1 is in the first metadata format. This determination may be made in any suitable way. For example, exchange facility 806 may determine, from porting configuration data included in configuration data 814, that the first DVR system and/or associated DVR service system use the first metadata format. Alternatively, exchange facility 806 may analyze the metadata 1202-1 and determine, from the analysis, that the metadata 1202-1 is defined in accordance with the first metadata format.

Exchange facility 806 may also determine a destination DVR service system (e.g., a destination DVR system included in the DVR service system) associated with a porting request and a metadata format used by the destination DVR service system. For example, exchange facility 806 may determine that the second metadata format is used by the destination DVR service system.

After exchange facility 806 has determined the first metadata format and the second metadata format, exchange facility 806 may convert the metadata 1202-1 from the first metadata format to the second metadata format in accordance with a predefined mapping between the first metadata format and the second metadata format. As mentioned, data representative of the predefined mapping may be maintained as configuration data 814 in storage facility 808.

To illustrate, exchange facility 806 may convert a media content asset identifier included in the metadata 1202-1 in the first metadata format to a media content asset identifier for the same media content asset in the second metadata format. Exchange facility 806 may add data representative of the media content asset identifier in the second metadata format to the modified metadata 1202-2. This process may be repeated for other instances of data included in metadata 1202-1 until metadata 1202-2 is generated in the second metadata format.

Figure 13:
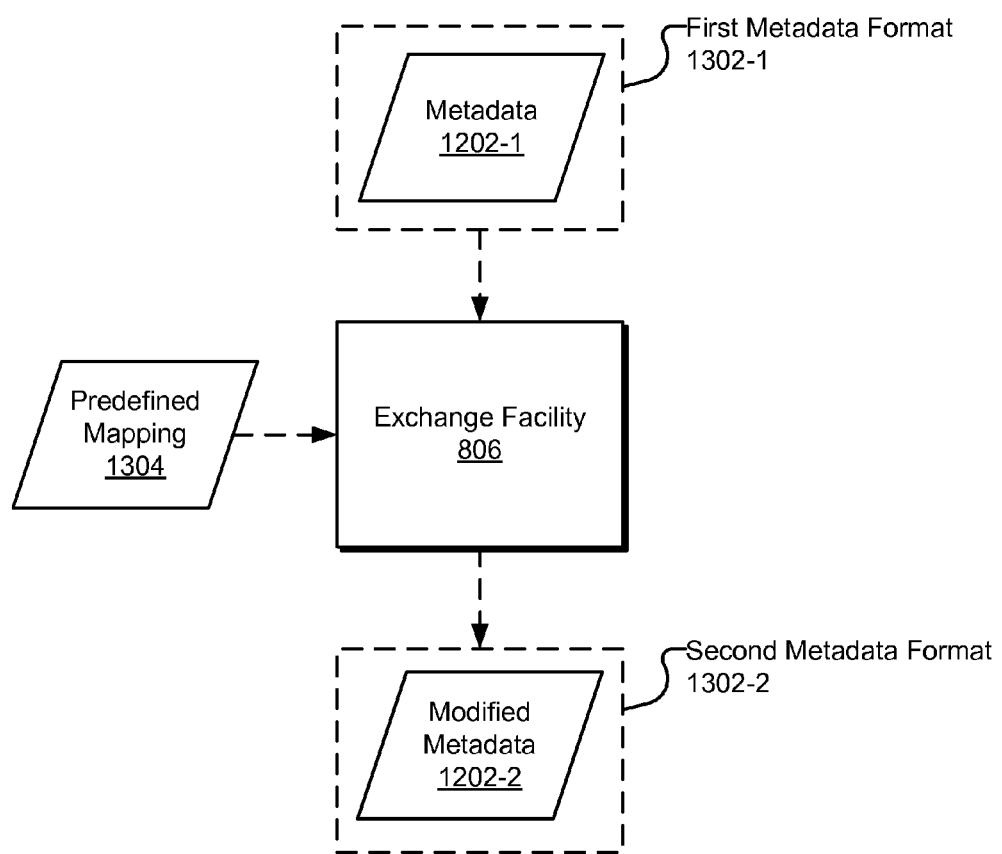
FIG. 13 illustrates an exemplary generation of a second DVR data set in a second metadata format based on a first DVR data set in a first metadata format according to principles described herein.

FIG. 13 illustrates exchange facility 806 generating metadata 1202-2 in a second data format 1302-2 based on metadata 1202-1 in a first metadata format 1302-1 and in accordance with a predefined mapping 1304 that specifies how to map the first metadata format 1302-1 to the second metadata format 1302-2. While FIG. 13 may illustrate a direct conversion of metadata from a first metadata format to a second metadata format in accordance with a single predefined mapping between the two metadata formats, this is illustrative only. The conversion may be accomplished in other suitable ways. In certain examples, for instance, exchange facility 806 may use an exchange service metadata format as an intermediary metadata format to convert the metadata 1202-1 from the first metadata format to the second metadata format.

Figure 14:
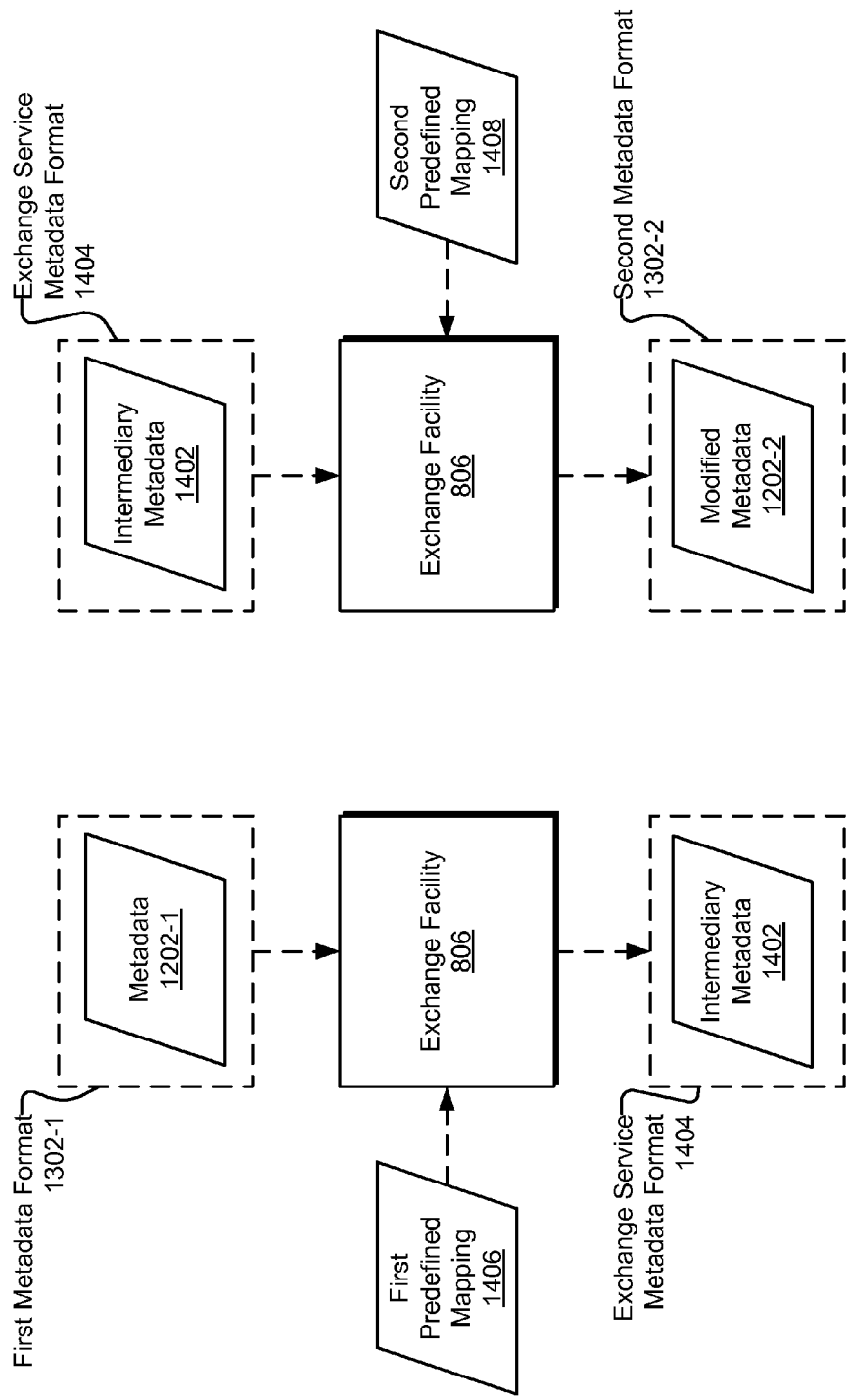
FIG. 14 illustrates another exemplary generation of a second DVR data set in a second metadata format based on a first DVR data set in a first metadata format according to principles described herein.

For example, FIG. 14 illustrates exchange facility 806 generating intermediary metadata 1402 in an exchange service metadata format 1404 based on metadata 1202-1 in the first metadata format 1302-1 and in accordance with a first predefined mapping 1406 that specifies how to map the first metadata format 1302-1 to the exchange service metadata format 1404. After metadata 1402 in the exchange service metadata format 1404 has been generated, exchange facility 806 may generate, as illustrated in FIG. 14, metadata 1202-2 in the second data format 1302-2 based on intermediary metadata 1402 in the exchange service metadata format 1404 and in accordance with a second predefined mapping 1408 that specifies how to map the exchange service metadata format 1404 to the second metadata format 1302-2.

The exchange service metadata format 1404 may be defined to facilitate conversion of metadata across various metadata formats. The exchange service metadata format may comprise any suitable format for metadata. In some examples, the exchange service metadata format may be defined as an industry standard for use in porting DVR data across DVR service systems by way of a DVR data exchange service provider by system 702.

Returning to FIG. 13, in certain examples, either of the first metadata format 1302-1 and the second metadata format 1302-2 may be the exchange service metadata format. That is, exchange facility 806 may receive and/or output metadata in the exchange service metadata format.

After exchange facility 806 has generated a second DVR data set based on a first DVR data set, such as described above, exchange facility 806 may provide the second DVR data set as output. The second DVR data set may be provided as output in any suitable way. For example, exchange facility 806 may provide the second DVR data set or an access link to the second DVR data set to interface facility 802, which may make the second DVR data set accessible outside of system 702. In certain examples, interface facility 802 may transmit data representative of the second DVR data set to the destination DVR service system (e.g., to a DVR system and/or a service provider system associated with the destination DVR service system) such that the DVR service system may receive and associate the second DVR data set with the destination DVR system. In other examples, interface facility 802 may make data representative of the second DVR data set available for request and download by the destination DVR service system (e.g., by a DVR system and/or a service provider system associated with the destination DVR service system).

A DVR service system in receipt of the second DVR data set from exchange system 702 may associate the second DVR data set with a destination DVR system in any suitable way such that the destination DVR system may operate in accordance with the second DVR data set. For example, the DVR service system may transmit data representative of the second DVR data set to the destination DVR system, which may receive and load the second DVR data set, and begin operating in accordance with the second DVR data set. An association of the second DVR data set with the destination DVR system may complete a porting of the DVR data set from a source DVR system to the destination DVR system.

Returning to FIG. 8, storage facility 808 may be configured to store configuration data 814 and exchange data 816 generated and/or used by configuration facility 804 and/or exchange facility 806. Configuration data 814 may include any of the exemplary data described herein, including porting configuration data defined by one or more DVR service providers and/or media content providers. Exchange data 816 may include any data generated and/or used by exchange facility 806, including DVR data sets used and/or generated by exchange facility 806. Storage facility 808 may maintain additional or alternative data as may serve a particular implementation.

In certain examples, system 702 may be configured to charge a fee for use of the DVR data exchange service provided by system 702 and/or for one or more of the data exchange operations performed by system 702. For example, system 702 may be configured to charge any entity involved in (e.g., an entity requesting) a porting of DVR data and/or a migration of a user account. In certain examples, system 702 may charge a DVR system user and/or a service provider for participation in the DVR data exchange service.

Figure 15:
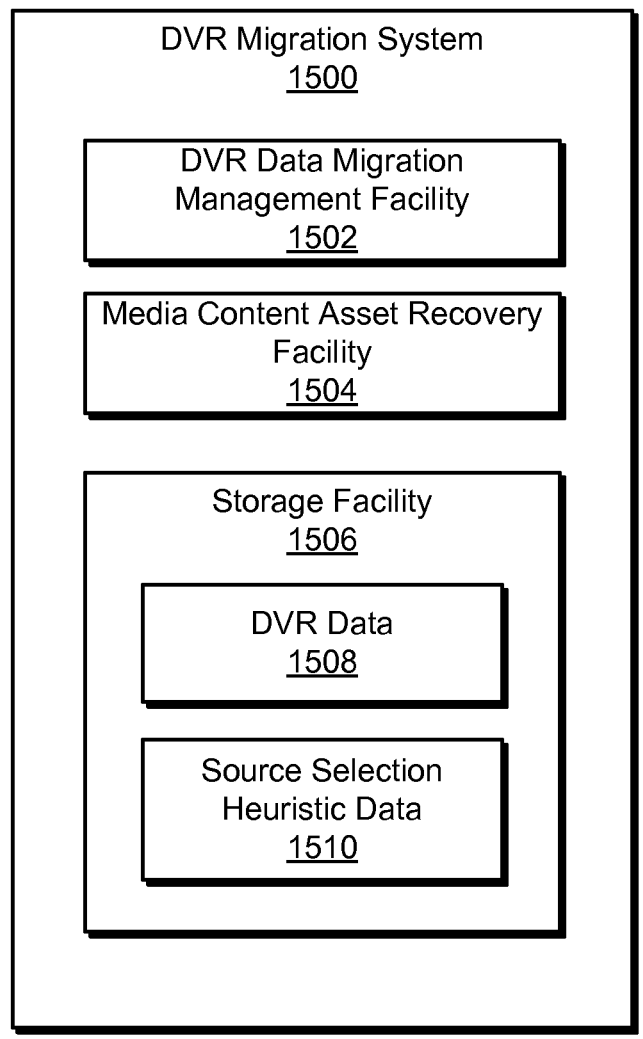
FIG. 15 illustrates an exemplary DVR migration system according to principles described herein.

As mentioned, DVR data porting may be performed in conjunction with a migration of a user account from a source DVR system to a destination DVR system. To illustrate, FIG. 15 shows an exemplary DVR migration system 1500 ("system 1500") configured to facilitate a migration of a user account from being associated with a first DVR system (e.g., first DVR system 504-1) to being associated with a second DVR system (e.g., second DVR system 504-2). As shown, system 1500 may include, without limitation, a DVR data migration management facility 1502 ("data migration facility 1502"), a media content asset recovery facility 1504 ("recovery facility 1504"), and a storage facility 1506 selectively and communicatively coupled to one another. It will be recognized that although facilities 1502-1506 are shown to be separate facilities in FIG. 15, any of facilities 1502-1506 may be combined into fewer facilities, such as into a single facility, or divided into more facilities as may serve a particular implementation.

System 1500 may be implemented by any suitable combination of computing devices and/or systems. For example, facilities 1502-1506 of system 1500 may be implemented entirely by media content provider system 104, by a server not associated with media content provider system 104, by a DVR system (e.g., second DVR system 504-2), by DVR service system 400, and/or by any other device and/or system. Alternatively, facilities 1502-1506 of system 1500 may be distributed across any combination of these systems and/or devices.

Data migration facility 1502 may be configured to receive a request for a user account to migrate from being associated with a first DVR system to being associated with a second DVR system. This may be performed in any suitable manner. For example, data migration facility 1502 may receive a request for the user account to upgrade or otherwise switch from the first DVR system to the second DVR system. As another example, data migration facility 1502 may receive the request by detecting a registration of the user account with the second DVR system.

Data migration facility 1502 may be configured to perform one or more DVR data migration operations. For example, in response to a request for a user account to migrate from being associated with a first DVR system to being associated with a second DVR system (a "migration request"), data migration facility 1502 may submit a porting request to a DVR data exchange service to facilitate a porting of DVR data from the first DVR system to the second DVR system. For instance, data migration facility 1502 may generate and send, to DVR data exchange system 702 (i.e., to a DVR data exchange service provided by DVR data exchange system 702) a request to port DVR data from the first DVR system to the second DVR system. The porting request may include any data useful to DVR data exchange system 702, such as described herein. Data migration facility 1502 and DVR data exchange system 702 may communicate using any suitable communication technologies, including any of those disclosed herein.

DVR data exchange system 702 may receive the porting request and perform one or more data exchange operations, such as described herein. As described, the operations may include providing a DVR data set as output (e.g., to data migration facility 1502).

Data migration facility 1502 may obtain the DVR data set output by DVR data exchange system 702 in any suitable way. For example, the DVR data set may be transmitted to data migration facility 1502 by DVR data exchange system 702, or data migration facility 1502 may access the DVR data set at a location to which DVR data exchange system 702 posted the DVR data set (e.g., to portal 1002).

After the DVR data set is obtained from the DVR data exchange service by data migration facility 1502, data migration facility 1502 may associate the DVR data set with the second DVR system (e.g., with second DVR system 504-2 as illustrated in FIG. 7). This may be performed in any suitable manner. For example, data migration facility 1502 may associate the DVR data set with the second DVR system by transmitting the DVR data set to the second DVR system for use by the second DVR system.

Additionally or alternatively, data migration facility 1502 may associate the DVR data set with the second DVR system by designating the DVR data set for use by the second DVR system. In this manner, the DVR data set does not necessarily have to be transmitted to the second DVR system. Instead, system 1500 and/or any other computing device separate from the second DVR system (e.g., a server maintained by a subscriber television service provider) may maintain and use the DVR data set to control one or more operations of the second DVR system.

After the DVR data set is associated with the second DVR system, the second DVR system may perform one or more operations in accordance with the DVR data set. This may minimize or eliminate the need for the user to extensively program the second DVR system as the user begins to use the second DVR system.

The association of the DVR data set with the second DVR system may complete a porting of a DVR data set from a first DVR system to a second DVR system. Such a DVR data set porting may be a component of a migration of a user account from the first DVR system to the second DVR system.

In certain examples, after the DVR data set is associated with the second DVR system to complete a porting of the DVR data set from the first DVR system to the second DVR system, a media content asset recovery component of the migration of the user account from the first DVR system to the second DVR system may be performed by recovery facility 1504 of system 1500. Recovery facility 1504 may perform recovery operations to attempt to rebuild, within the second DVR system, the library of media content assets stored by the first DVR system at a time associated with the migration request.

For example, recovery facility 1504 may identify and direct the second DVR system to acquire at least one media content asset included in the library of media content assets stored by the first DVR system (as the library existed at a time associated with the data set migration such as the time of the migration request) from a media content source in accordance with the DVR data set. For example, recovery facility 1504 may use metadata included in the DVR data set to identify a media content asset included in the library of media content assets, select a media content source configured to distribute the media content asset, and direct the second DVR system to acquire (e.g., download or record) the media content asset from the selected media content source.

In some examples, the media content source from which recovery facility 1504 acquires the media content asset may be different than the first DVR system. Acquiring a media content asset from a media content source other than the first DVR system as opposed to acquiring the media content source from the first DVR system directly (e.g., by migrating data representative of the media content asset) may be necessary and/or preferred such as in cases where the media content asset stored by the first DVR system is protected (e.g., encrypted) using one or more DRM heuristics.

Recovery facility 1504 may direct the second DVR system to acquire a media content asset from a media content source in any suitable way. As an example, recovery facility 1504 may be at least partially implemented by the second DVR system, in which case recovery facility 1504 may direct any other components of the second DVR system to acquire the media content asset. As another example, recovery facility 1504 may be at least partially implemented by a server remote from the second DVR system and may be configured to communicate with and direct the second DVR system to acquire the media content asset from the media content source, and the second DVR system may respond by acquiring the media content asset from the media content source, without the media content asset going through recovery facility 1504 (e.g., without going through a server implementing recovery facility 1504). As another example, recovery facility 1504 may be at least partially implemented by a server remote from the second DVR system and may be configured to acquire and transmit the media content asset to the second DVR system.

After a media content asset included in the library of media content assets has been identified, recovery facility 1504 may select, in accordance with a source selection heuristic, a media content source from which the media content asset is to be acquired. The selected media content source may include any source other than the first DVR system and may be selected in accordance with the source selection heuristic.

Figure 16:
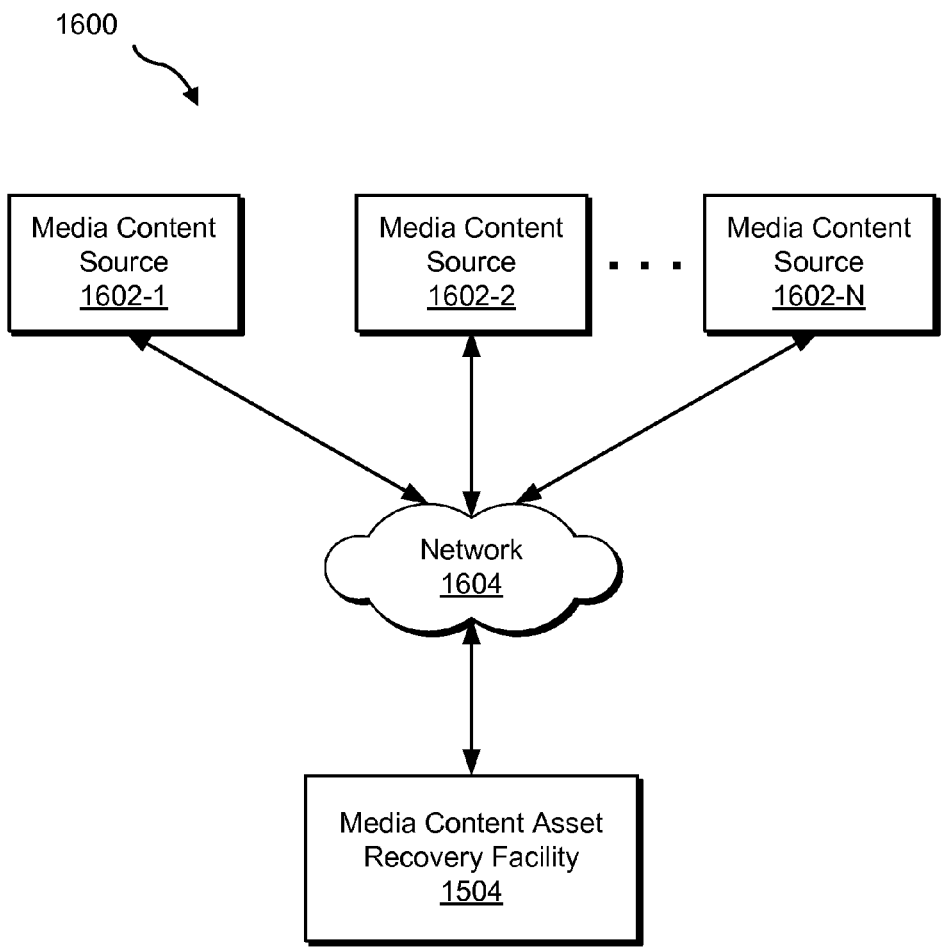
FIG. 16 illustrates an exemplary configuration in which a media content asset recovery facility may select a media content source from a plurality of media content sources according to principles described herein.

To illustrate, FIG. 16 shows an exemplary configuration 1600 in which recovery facility 1504 may select a media content source from a plurality of media content sources 1602 (e.g., media content source data 1602-1 through media content source 1602-N). As shown, recovery facility 1504 may communicate with media content sources 1602 by way of a network 1604, which may include any of the networks described herein.

Each media content source 1602 may have one or more media content assets available for distribution. However, each media content source 1602 may be distinct in terms of how it maintains and/or distributes a particular media content asset. For example, media content sources 1602 may include an Internet source configured to maintain one or more downloadable files representative of the media content asset, a broadcast television source configured to broadcast the media content asset during a scheduled time period, a video-on-demand source configured to distribute the media content assets in the form of video-on-demand assets, a streaming content source configured to stream the media content asset on demand or during a scheduled time period, a multicast distribution source configured to multicast the media content asset during a scheduled time period, a DVR system associated with a different user account and configured to distribute the media content assets in accordance with a peer-to-peer file sharing heuristic, and/or any other type of media content source as may serve a particular implementation.

As another example, different versions of the same media content asset may be maintained and distributed by different media content sources 1602. To illustrate, media content source 1602-1 may maintain and distribute a version of a media content asset that has a particular video quality (e.g., standard definition ("SD"), high definition ("HD"), etc.), file size, and/or format (e.g., MPEG-4, AVI, etc.) while media content source 1602-2 may maintain and distribute a version of the media content asset that has a different video quality, file size, and/or format. It will be recognized that the versions of the media content asset maintained by each media content source 1602-1 may have any other unique attribute.

As mentioned, recovery facility 1504 may select, in accordance with a source selection heuristic, a particular media content source (e.g., one of media content sources 1602) from which a media content asset will be acquired. As used herein, a "source selection heuristic" may refer to any heuristic or technique that may be used by recovery facility 1504 to select a particular media content source from which to acquire a particular media content asset for storage by the second DVR system. Using the source selection heuristic, recovery facility 1504 may optimize a manner in which the media content asset is acquired.

To illustrate, the source selection heuristic may be based on a relative importance of a plurality of source selection factors associated with a plurality of media content sources. For example, recovery facility 1504 may select a particular media content source from a plurality of media content sources by weighing a plurality of source selection factors associated with the plurality of media content sources and selecting the media content source from the plurality of media content sources in accordance with the weighing of the source selection factors.

The source selection factors considered by media content asset management facility 1504 may include any factor associated with the media content sources and/or with an acquisition of the media content asset as may serve a particular implementation. For example, the source selection factors may include, but are not limited to, an acquisition time factor, a media quality factor, a data storage size factor, a data format factor, and an acquisition cost factor.

The relative importance of the source selection factors (i.e., a weighting of the source selection factors) may be determined automatically by recovery facility 1504, specified by a user, and/or otherwise set as may serve a particular implementation. For example, media content asset management facility 1504 may automatically weight a first source selection factor more than a second source selection factor by analyzing data included in the DVR data set associated with the second DVR system, identifying one or more tendencies of the user associated with the second DVR system, and/or in any other suitable manner.

Returning to FIG. 15, storage facility 1506 may be configured to store DVR data 1508 representative of one or more DVR data sets (e.g., a DVR data set obtained from a DVR data exchange system in response to a porting request) and source selection heuristic data 1510 representative of one or more source selection heuristics. Storage facility 1506 may maintain additional or alternative data as may serve a particular implementation.

The rebuilding of a library of media content assets within the second DVR system may be based on any DVR data included in a DVR data set ported from the first DVR system to the second DVR system. For example, the identification and acquisition of a media content asset for storage by the second DVR system may be based on any of the metadata, settings data, and/or business logic data described herein. To illustrate, recovery facility 1504 may identify, from metadata included in a ported DVR data set, a media content asset included in the library of media content assets stored by the first DVR system. Based on electronic program guide data, recovery facility 1504 may determine that the media content program is scheduled to be rebroadcast at a particular time on a particular media content channel. Recovery facility 1504 may direct the second DVR system to schedule a recording of the rebroadcast of the media content asset. The second DVR system may schedule the recording in accordance with any settings and/or business logic specified by settings data and/or business logic data included in the DVR data set ported from the first DVR system (e.g., start and stop times of the scheduled recording may be automatically adjusted based on settings and/or business logic in the ported DVR data set).

In certain examples, one or more migration operations associated with a migration of a user account from a first DVR system to a second DVR system may be performed in any of the ways described in co-pending U.S. patent application Ser No. 13/731,571, filed the same day as the present application, and entitled "Methods and Systems for Facilitating Migration of a User Account from a First DVR System to a Second DVR System" and/or co-pending U.S. patent application Ser. No. 13/731,619, filed the same day as the present application, and entitled "Media Content Asset Recovery Methods and Systems." The contents of both of these applications are incorporated herein by reference in their entirety.

Figure 17:
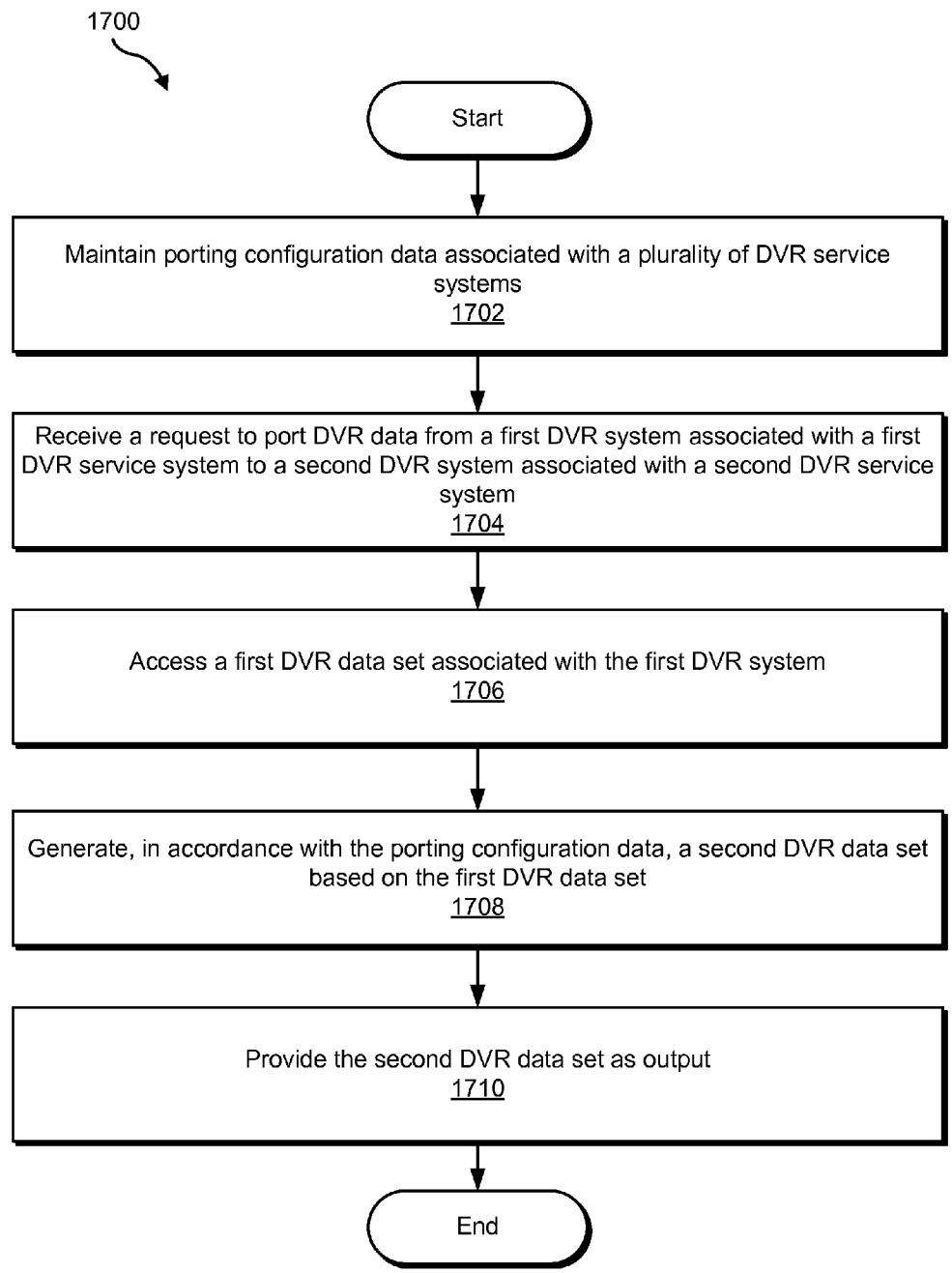
FIG. 17 illustrates an exemplary DVR data exchange method according to principles described herein.

FIG. 17 illustrates an exemplary DVR data exchange method 1700. While FIG. 17 illustrates exemplary steps according to one embodiment, other embodiments may omit, add to, reorder, combine, and/or modify any of the steps shown in FIG. 17. One or more of the steps shown in FIG. 17 may be performed by a DVR data exchange system (e.g., system 702) and/or any implementation thereof.

In step 1702, a DVR data exchange system maintains porting configuration data associated with a plurality of DVR service systems. For example, the DVR data exchange system may maintain any of the porting configuration data described herein, including first porting configuration data associated with a first DVR service system and second porting configuration data associated with a second DVR service system. Step 1702 may be performed in any of the ways described herein.

In step 1704, the DVR data exchange system receives a request to port DVR data from a first DVR system associated with a first DVR service system to a second DVR system associated with a second DVR service system. Step 1704 may be performed in any of the ways described herein.

In step 1706, the DVR data exchange system accesses a first DVR data set associated with the first DVR system. Step 1706 may be performed in any of the ways described herein.

In step 1708, the DVR data exchange system generates, in accordance with the porting configuration data, a second DVR data set based on the first DVR data set. For example, the DVR data exchange system may generate the second DVR data set based on the first DVR data set and in accordance with the first porting configuration data associated with the first DVR service system and the second porting configuration data associated with the second DVR service system. Step 1708 may be performed in any of the ways described herein.

In step 1710, the DVR data exchange system provides the second DVR data set as output. Step 1710 may be performed in any of the ways described herein.

In certain examples, steps 1706-1710 may be performed in response to the request received in step 1704.

Figure 18:
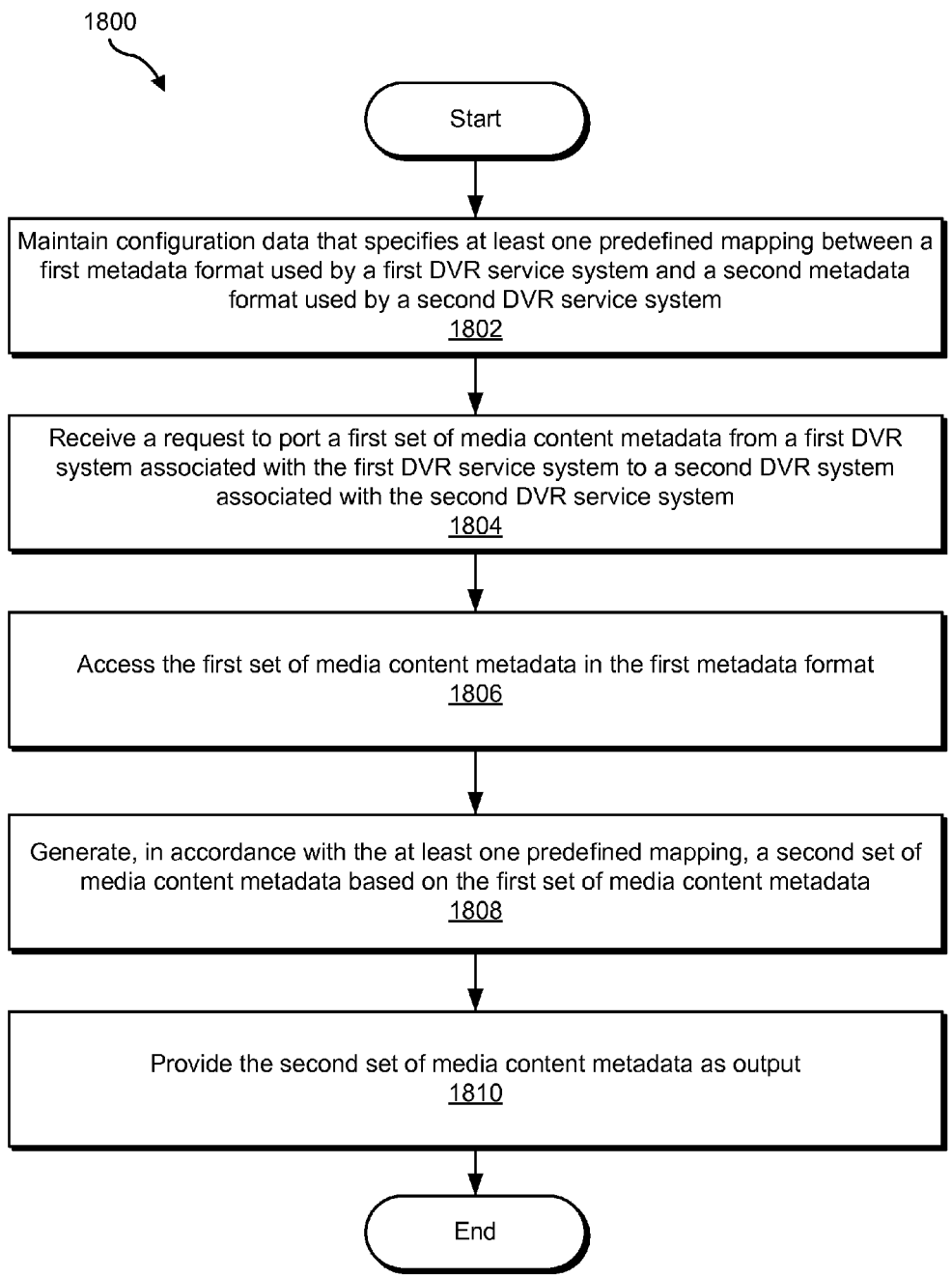
FIG. 18 illustrates another exemplary DVR data exchange method according to principles described herein.

FIG. 18 illustrates another exemplary DVR data exchange method 1800. While FIG. 18 illustrates exemplary steps according to one embodiment, other embodiments may omit, add to, reorder, combine, and/or modify any of the steps shown in FIG. 18. One or more of the steps shown in FIG. 18 may be performed by a DVR data exchange system (e.g., system 702) and/or any implementation thereof.

In step 1802, a DVR data exchange system maintains configuration data that specifies at least one predefined mapping between a first metadata format used by a first DVR service system and a second metadata format used by a second DVR service system. Step 1802 may be performed in any of the ways described herein.

In step 1804, the DVR data exchange system receives a request to port a first set of media content metadata from a first DVR system associated with the first DVR service system to a second DVR system associated with the second DVR service system. Step 1804 may be performed in any of the ways described herein.

In step 1806, the DVR data exchange system accesses the first set of media content metadata in the first metadata format. Step 1806 may be performed in any of the ways described herein.

In step 1808, the DVR data exchange system generates, in accordance with the at least one predefined mapping, a second set of media content metadata based on the first set of media content metadata. Step 1808 may be performed in any of the ways described herein.

In step 1810, the DVR data exchange system provides the second set of media content metadata as output. Step 1810 may be performed in any of the ways described herein.

In certain examples, steps 1806-1810 may be performed in response to the request received in step 1804.

Figure 19:
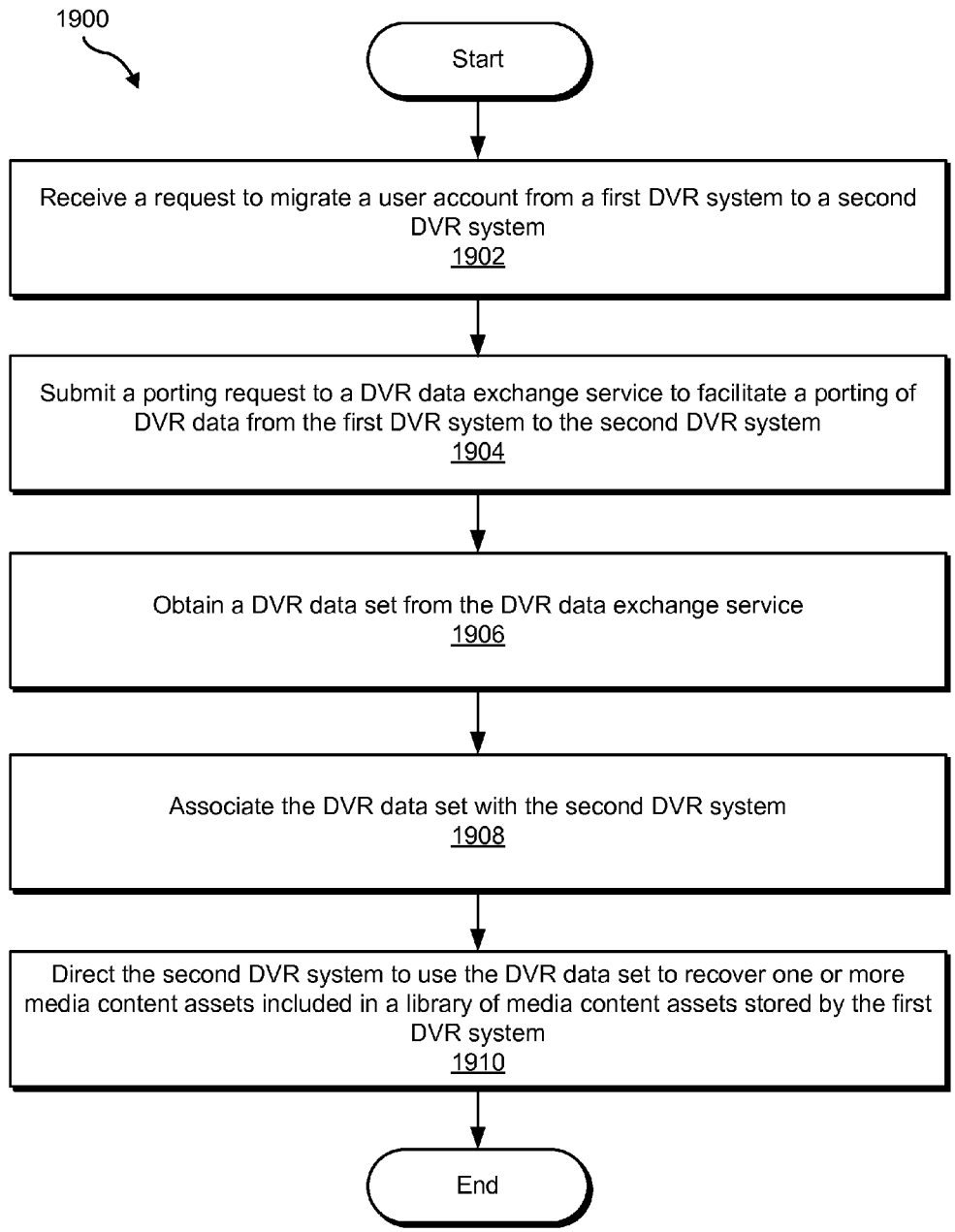
FIG. 19 illustrates an exemplary method of migrating a user account from a first DVR system to a second DVR system according to principles described herein.

FIG. 19 illustrates an exemplary method 1900 of migrating a user account from a first DVR system to a second DVR system. While FIG. 19 illustrates exemplary steps according to one embodiment, other embodiments may omit, add to, reorder, combine, and/or modify any of the steps shown in FIG. 19. One or more of the steps shown in FIG. 19 may be performed by a DVR migration system (e.g., DVR migration system 1500) and/or any implementation thereof.

In step 1902, a DVR migration system receives a request to migrate a user account from a first DVR system to a second DVR system. Step 1902 may be performed in any of the ways described herein.

In step 1904, the DVR migration system submits a porting request to a DVR data exchange service to facilitate a porting of DVR data from the first DVR system to the second DVR system. In certain examples, step 1904 may be performed in response to and/or based on the migration request received in step 1902. Step 1904 may be performed in any of the ways described herein.

In step 1906, the DVR migration system obtains a DVR data set from the DVR data exchange service. The DVR data set may be output by the DVR data exchange service in response to the porting request submitted to the DVR data exchange service in step 1904. Step 1904 may be performed in any of the ways described herein.

In step 1908, the DVR migration system associates the DVR data set with the second DVR system. Step 1908 may be performed in any of the ways described herein.

In step 1910, the DVR migration system directs the second DVR system to use the DVR data set to recover one or more media content assets included in a library of media content assets stored by the first DVR system. Step 1910 may be performed in any of the ways described herein.

In certain examples, one or more of steps 1904-1910 may be performed in response to the migration request received in step 1904.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a disk, hard disk, magnetic tape, any other magnetic medium, a CD-ROM, DVD, any other optical medium, a RAM, a PROM, an EPROM, a FLASH-EEPROM, any other memory chip or cartridge, or any other tangible medium from which a computer can read.

Figure 20:
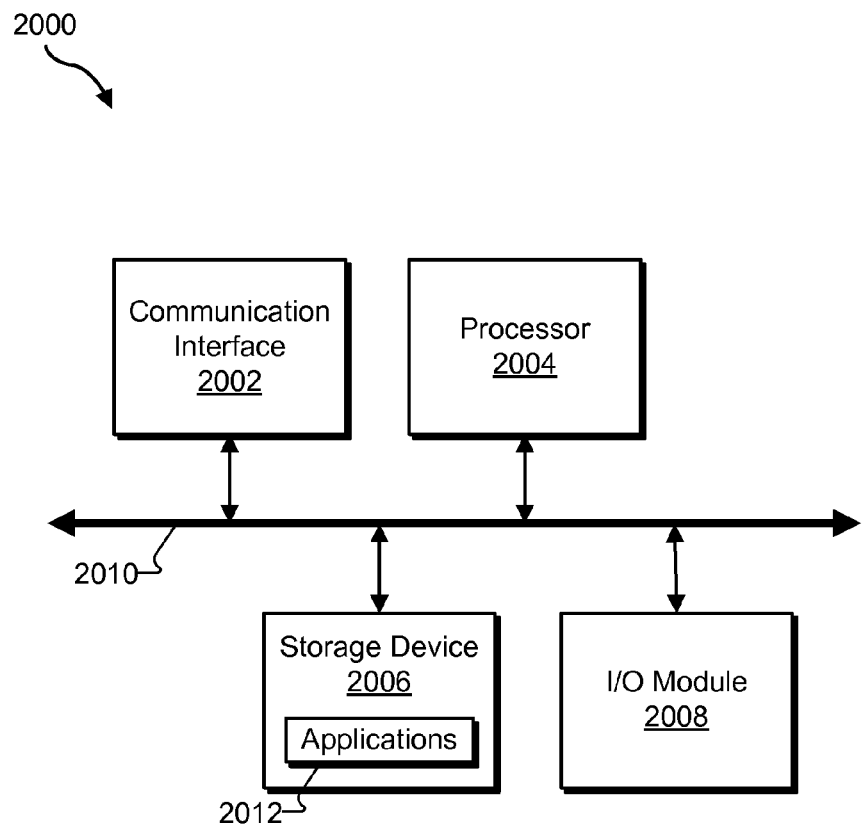
FIG. 20 illustrates an exemplary computing device according to principles described herein.

FIG. 20 illustrates an exemplary computing device 2000 that may be configured to perform one or more of the processes described herein. As shown in FIG. 20, computing device 2000 may include a communication interface 2002, a processor 2004, a storage device 2006, and an input/output ("I/O") module 2008 communicatively connected via a communication infrastructure 2010. While an exemplary computing device 2000 is shown in FIG. 20, the components illustrated in FIG. 20 are not intended to be limiting. Additional or alternative components may be used in other embodiments. Components of computing device 2000 shown in FIG. 20 will now be described in additional detail.

Communication interface 2002 may be configured to communicate with one or more computing devices. Examples of communication interface 2002 include, without limitation, a wired network interface (such as a network interface card), a wireless network interface (such as a wireless network interface card), a modem, an audio/video connection, and any other suitable interface.

Processor 2004 generally represents any type or form of processing unit capable of processing data or interpreting, executing, and/or directing execution of one or more of the instructions, processes, and/or operations described herein. Processor 2004 may direct execution of operations in accordance with one or more applications 2012 or other computer-executable instructions such as may be stored in storage device 2006 or another computer-readable medium.

Storage device 2006 may include one or more data storage media, devices, or configurations and may employ any type, form, and combination of data storage media and/or device. For example, storage device 2006 may include, but is not limited to, a hard drive, network drive, flash drive, magnetic disc, optical disc, random access memory ("RAM"), dynamic RAM ("DRAM"), other non-volatile and/or volatile data storage units, or a combination or sub-combination thereof. Electronic data, including data described herein, may be temporarily and/or permanently stored in storage device 2006. For example, data representative of one or more executable applications 2012 configured to direct processor 2004 to perform any of the operations described herein may be stored within storage device 2006. In some examples, data may be arranged in one or more databases residing within storage device 2006.

I/O module 2008 may be configured to receive user input and provide user output and may include any hardware, firmware, software, or combination thereof supportive of input and output capabilities. For example, I/O module 2008 may include hardware and/or software for capturing user input, including, but not limited to, a keyboard or keypad, a touch screen component (e.g., touch screen display), a receiver (e.g., an RF or infrared receiver), and/or one or more input buttons.

I/O module 2008 may include one or more devices for presenting output to a user, including, but not limited to, a graphics engine, a display (e.g., a display screen, one or more output drivers (e.g., display drivers), one or more audio speakers, and one or more audio drivers. In certain embodiments, I/O module 2008 is configured to provide graphical data to a display for presentation to a user. The graphical data may be representative of one or more graphical user interfaces and/or any other graphical content as may serve a particular implementation.

In some examples, any of the systems and/or facilities described herein may be implemented by or within one or more components of computing device 2000. For example, one or more applications 2012 residing within storage device 2006 may be configured to direct processor 2004 to perform one or more processes or functions associated with interface facility 802, configuration facility 804, exchange facility 806, DVR data migration management facility 1502, and/or media content asset recovery facility 1504. Likewise, storage facility 808 and/or storage facility 1506 may be implemented by or within storage device 2006.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
   maintaining, by a digital video recording ("DVR") data exchange system, first porting configuration data associated with a first DVR service system and second porting configuration data associated with a second DVR service system;
   receiving, by the DVR data exchange system, a request to port DVR data from a first DVR system associated with the first DVR service system to a second DVR system associated with the second DVR service system; and
   in response to the request,
      accessing, by the DVR data exchange system, a first DVR data set associated with the first DVR system, generating, by the DVR data exchange system in accordance with the first porting configuration data and the second porting configuration data, a second DVR data set based on the first DVR data set, and providing, by the DVR data exchange system, the second DVR data set as output.

2. The method of claim 1, wherein the maintaining comprises:

receiving, by the DVR data exchange system from a first DVR service provider, the first porting configuration data associated with the first DVR service system;

receiving, by the DVR data exchange system from a second DVR service provider separate from the first DVR service provider, the second porting configuration data associated with the second DVR service system; and storing, by the DVR data exchange system, the first porting configuration data and the second porting configuration data.

3. The method of claim 2, wherein the first DVR service system is associated with the first DVR service provider and the second DVR service system is associated with the second DVR service provider.

4. The method of claim 1, wherein:

the first DVR data set includes media content metadata for a library of media content assets recorded by the first DVR system, the media content metadata defined in accordance with a first metadata format associated with the first DVR service system; and the second DVR data set includes the media content metadata defined in accordance with a second metadata format associated with the second DVR service system.

5. The method of claim 4, wherein the generating comprises converting the media content metadata from the first metadata format to the second metadata format in accordance with a predefined mapping between the first metadata format and the second metadata format.

6. The method of claim 5, further comprising maintaining, by the DVR data exchange system, data representative of the predefined mapping between the first metadata format and the second metadata format.

7. The method of claim 4, wherein the generating comprises:

converting the media content metadata from the first metadata format to an exchange service metadata format based on a predefined mapping between the first metadata format and the exchange service metadata format; and converting the media content metadata from the exchange service metadata format to the second metadata format based on a predefined mapping between the exchange service metadata format and the second metadata format.

8. The method of claim 1, wherein:

the first DVR data set includes media content metadata for a library of media content programs recorded by the first DVR system;

the accessing comprises accessing the media content metadata in an exchange service metadata format; and the providing comprises providing the media content metadata as output in the exchange service metadata format.

9. The method of claim 1, wherein:

the first porting configuration data comprises a first set of DVR system specifications for the first DVR system; and the second porting configuration data comprises a second set of DVR system specifications for the second DVR system.

10. The method of claim 1, wherein:

the first porting configuration data comprises a first set of porting settings defined by a first DVR service provider associated with the first DVR service system; and the second porting configuration data comprises a second set of porting settings defined by a second DVR service provider associated with the second DVR service system.

11. The method of claim 1, wherein the request to port is associated with a migration of a user account from being associated with the first DVR system to being associated with the second DVR system.

12. The method of claim 1, embodied as computer-executable instructions on at least one non-transitory computer-readable medium.

13. A method comprising:

maintaining, by a digital video recording ("DVR") data exchange system, configuration data that specifies at least one predefined mapping between a first metadata format used by a first DVR service system and a second metadata format used by a second DVR service system;

receiving, by the DVR data exchange system, a request to port a first set of media content metadata associated with a library of media content assets stored by a first DVR system associated with the first DVR service system from the first DVR system to a second DVR system associated with the second DVR service system; and in response to the request, accessing, by the DVR data exchange system, the first set of media content metadata in the first metadata format, generating, by the DVR data exchange system in accordance with the at least one predefined mapping, a second set of media content metadata in the second metadata format based on the first set of media content metadata, and providing, by the DVR data exchange system, the second set of media content metadata in the second metadata format as output.

14. The method of claim 13, wherein the generating comprises converting the first set of media content metadata in the first metadata format to the second set of media content metadata in the second metadata format in accordance with the at least one predefined mapping between the first metadata format and the second metadata format.

15. The method of claim 13, wherein the generating comprises:

converting the first set of media content metadata in the first metadata format to an intermediary set of media content metadata in an exchange service metadata format based on a first predefined mapping included in the at least one predefined mapping; and converting the intermediary set of media content metadata in the exchange service metadata format to the second set of media content metadata in the second metadata format in accordance with a second predefined mapping included in the at least one predefined mapping.

16. The method of claim 13, wherein the request to port is associated with a migration of a user account from being associated with the first DVR system to being associated with the second DVR system.

17. The method of claim 13, wherein the first DVR service system is associated with a first DVR service provider and the second DVR service system is associated with a second DVR service provider.

18. The method of claim 13, embodied as computer-executable instructions on at least one non-transitory computer-readable medium.

19. A method comprising:
receiving, by a digital video recording ("DVR") migration system, a request for a user account to migrate from being associated with a first DVR system to being associated with a second DVR system;
submitting, by the DVR migration system in response to the request for the user account to migrate, a porting request to a DVR data exchange service to facilitate a porting of DVR data from the first DVR system to the second DVR system;
obtaining, by the DVR migration system, a DVR data set provided by the DVR data exchange service in response to the porting request; and
associating, by the DVR migration system, the DVR data set with the second DVR system.

20. The method of claim 19, further comprising:
directing, by the DVR migration system, the second DVR system to use the DVR data set to recover one or more media content assets included in a library of media content assets stored by the first DVR system.

21. The method of claim 19, embodied as computer-executable instructions on at least one non-transitory computer-readable medium.

22. A system comprising:
at least one computing device that implements:
a digital video recording ("DVR") data migration management facility that
receives a request for a user account to migrate from being associated with a first DVR system to being associated with a second DVR system,
submits, in response to the request for the user account to migrate, a porting request to a DVR data exchange service to facilitate a porting of DVR data from the first DVR system to the second DVR system,
obtains a DVR data set provided by the DVR data exchange service in response to the porting request, and
associates the DVR data set with the second DVR system; and
a media content asset recovery facility that directs the second DVR system to use the DVR data set to recover one or more media content assets included in a library of media content assets stored by the first DVR system.

* * * * *